(12) United States Patent
Gulick et al.

(10) Patent No.: US 12,134,919 B2
(45) Date of Patent: Nov. 5, 2024

(54) TABLE TOP SECURITY APPARATUS FOR A PORTABLE ELECTRONIC DEVICE

(71) Applicant: Scorpion Security Products, Inc., Vestal, NY (US)

(72) Inventors: Franklyn W. Gulick, Binghamton, NY (US); Gary R. Page, Chenango Forks, NY (US); Patrick McEwen, Greene, NY (US); Andy Bartoszewski, Syracuse, NY (US); Patrick Dunleavy, Endwell, NY (US); Adam Bixby, Endicott, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 0 days.

(21) Appl. No.: 18/097,883

(22) Filed: Jan. 17, 2023

(65) Prior Publication Data

US 2023/0151647 A1   May 18, 2023

Related U.S. Application Data

(63) Continuation-in-part of application No. 17/241,678, filed on Apr. 27, 2021, now Pat. No. 11,553,790.

(60) Provisional application No. 63/341,054, filed on May 12, 2022, provisional application No. 63/405,652, filed on Sep. 12, 2022, provisional application No. 63/015,767, filed on Apr. 27, 2020, provisional application No. 63/048,367, filed on Jul. 6, 2020.

(51) Int. Cl.
*E05B 73/00* (2006.01)
*F16M 11/10* (2006.01)
*F16M 11/22* (2006.01)
*F16M 13/02* (2006.01)

(52) U.S. Cl.
CPC ......... *E05B 73/0082* (2013.01); *F16M 11/10* (2013.01); *F16M 11/22* (2013.01); *F16M 13/02* (2013.01)

(58) Field of Classification Search
None
See application file for complete search history.

(56) References Cited

U.S. PATENT DOCUMENTS

| 3,991,967 | A | * | 11/1976 | Sack | A47B 23/043 |
|---|---|---|---|---|---|
| | | | | | 248/456 |
| 2003/0042389 | A1 | * | 3/2003 | Krapf | A47B 97/04 |
| | | | | | 248/447 |
| 2019/0038018 | A1 | * | 2/2019 | Hill | F16B 2/12 |
| 2019/0326767 | A1 | * | 10/2019 | Fan | F16M 11/28 |

(Continued)

*Primary Examiner* — Steven M Marsh
(74) *Attorney, Agent, or Firm* — Barclay Damon LLP

(57) ABSTRACT

A security apparatus for securing a portable electronic device for retail display includes a base assembly extending along a base assembly axis and structured to couple to a display fixture. The base assembly includes a base portion structured to move along the base assembly axis. A body extends along a body axis and is structured configured to couple to the base portion. A first securing member is coupled to the body and a second securing member is coupled to the body. At least one of the first and second securing members moves along the body axis relative to the body. The first and second securing members each include a device engagement portion structured to at least partially surround a portion of the portable electronic device. The base portion is structured to move the body along the base assembly axis.

20 Claims, 42 Drawing Sheets

(56) References Cited

U.S. PATENT DOCUMENTS

2020/0107653 A1\* 4/2020 Leyden ..................... F16B 2/12
2023/0028193 A1\* 1/2023 Penny .................... F16M 13/00

\* cited by examiner

TABLE TOP SECURITY APPARATUS FOR A PORTABLE ELECTRONIC DEVICE

CROSS-REFERENCE TO RELATED APPLICATIONS

This application claims the benefit of and priority to U.S. Provisional Patent Application No. 63/341,054, filed May 12, 2022 and U.S. Provisional Patent Application No. 63/405,652, filed Sep. 12, 2022, and is a continuation-in-part application of U.S. patent application Ser. No. 17/241,678, filed Apr. 27, 2021, which claims priority to and the benefit of U.S. Patent Application No. 63/015,767, filed Apr. 27, 2020, and U.S. Patent Application No. 63/048,367, filed on Jul. 6, 2020. The entire contents of these applications are hereby incorporated by reference.

TECHNOLOGICAL FIELD

This disclosure and the claimed device relates to a table top security apparatus (security apparatus) for a portable electronic device that does not require the security device to be fastened to a display surface, such as table top, and further enables a customer to pick up the portable electronic device while it is secured by the security apparatus, but inhibits the customer from removing the secured portable electronic device from the retail area. Specifically, the security apparatus does not require direct securing to the display surface or table top and therefore, inhibits damage to the surface of the display fixture. Moreover, the security apparatus is tailored to secure laptop computers as well as tablet devices with detachable keyboards.

BACKGROUND

Retailers sell a wide range of portable or hand held electronic devices that can assist in or perform a multitude of tasks for the a user or customer. Portable electronic devices such as laptop computers and tablet computers or tablets have become more and more popular. Tablets have specifically become more popular due to the introduction of detachable keyboards because they enable the tablet to be used like a laptop computer when the keyboard is attached, but also allow detachment of the keyboard for use a tablet. The detachable keyboard can couple to the tablet in a variety of manners, including a magnetic connection. Another part of the attraction of the detachable keyboard is that it can be articulated in a variety of positions with respect to the tablet in order to suit the needs and comfort of the user. Part of the purchasing experience is having the ability to examine and test the tablet along with the detachable keyboard. This is done using floor models that are fitted with some form of security apparatus to prevent theft of the portable electronic device.

The current security apparatuses used to secure tablet computers with detachable keyboards and laptop computers in the retail setting are either overly complicated and cumbersome, and/or they sacrifice security for functional display, and/or they damage the display fixture. Cumbersome and overly complicated security apparatuses tend to be very good at preventing theft of portable electronic devices, but limit the customer interaction with such devices. These security apparatuses are also expensive to manufacture and purchase. Conversely, simpler and less complex security apparatuses can allow for improved customer interaction with the portable electronic device, however are less effective at preventing theft of these devices.

These are just some of the problems associated with current security apparatuses for portable electronic devices.

SUMMARY

An embodiment of a security apparatus comprises a display support and a keyboard retainer. The display support comprises a first retaining portion including a first holder, a second retaining portion pivotally coupled to the first retaining portion and includes a second holder, and a lock assembly defining a locked state and an unlocked state. They keyboard retainer comprises a first base pivotally coupled to the first retaining portion and including a top surface extending along a top surface plane, and an opposing bottom surface. The first base comprises one or more securing members extending from the bottom surface of the first base and one or more retainers extending above the top surface plane of the first and each retainer comprises a retaining member extending away from the first base. A second base pivotally couples to the second retaining portion and includes a top surface extending along a top surface plane, and an opposing bottom surface. One or more securing members extend from the bottom surface of the second base and one or more retainers extending above the top surface plane of the second base and each retainer comprises a retaining member extending away from the second base. When the lock assembly is in the unlocked state, the first holder and the second holder are enabled to pivot relative to each other. When the lock assembly is in the locked state, the first holder and the second holder are inhibited from pivoting relative to each other.

In an embodiment, the first holder further comprises a first brace extending from the first support, wherein the first brace and first support extend along a same plane. In an embodiment, the second holder further comprises a second brace extending from the second support, wherein the second brace and second support extend along a same plane. In a further embodiment, the first holder further comprises at least one side extending along a side axis, the at least partially defines a pocket, the second holder further comprises at least one side that at least partially defines a pocket, and at least one of the sides defines an opening. In another embodiment, the one or more securing members comprise a threaded surface. In an embodiment, the first holder and the second holder each comprise an end portion, wherein the end portion extends along an axis that intersects the side axis.

In another embodiment, a security apparatus for a portable electronic device comprises a support assembly and a keyboard retainer. The support assembly comprises a first retaining portion, a second retaining portion pivotally coupled to the first retaining portion, and a lock assembly defining a locked state and an unlocked state. When in the unlocked state, the first retaining portion and the second retaining portion are enabled to pivot relative to each other, and when in the locked state, the first retaining portion and the second retaining portion are inhibited from pivoting relative to each other. The keyboard retainer comprises a first base pivotally coupled to the first retaining portion and included a top surface extending along a top surface plane, and an opposing bottom surface. The first base comprises one or more securing members extending from the bottom surface of the first base, and one or more retainers extending above the top surface plane of the first and each retainer comprising a retaining member extending away from the first base. A second base is pivotally coupled to the second retaining portion and includes a top surface extending along a top surface plane, and an opposing bottom surface. The second base comprises one or more securing members extending from the bottom surface of the second base, and one or more retainers extending above the top surface plane of the second base and each retainer comprising a retaining member extending away from the second base.

In an embodiment, the first retaining portion defines a pocket configured to retain a portion of a portable electronic device. In an embodiment, the second retaining portion defines a pocket configured to retain a portion of a portable electronic device. In an embodiment, the one or more securing members comprise a threaded surface.

An embodiment of a security system for a portable electronic device comprises a mounting plate defining one or more openings and a security apparatus. The security apparatus comprises a first retaining portion, a second retaining portion pivotally coupled to the first retaining portion, and a lock assembly defining a locked state and an unlocked state. When in the unlocked state, the first retaining portion and the second retaining portion are enabled to pivot relative to each other, and when in the locked state, the first retaining portion and the second retaining portion are inhibited from pivoting relative to each other. The security apparatus further includes a keyboard retainer comprising at least one base member pivotally coupled to the first retaining portion and the second retaining portion. The at least one base member includes a top surface extending along a plane and an opposing bottom surface. The at least one base member comprises one or more securing members extending from the bottom surface and configured to couple to the mounting plate, and one or more retainers extending above the top surface plane and each retainer comprising a retaining member extending away from the at least one base member. The mounting plate is configured to support the portable electronic device and the security apparatus.

In an embodiment, the mounting plate further comprises one or more anchors configured to couple the mounting plate to a display fixture. In an embodiment, the first retaining portion defines a pocket configured to retain a portion of a portable electronic device. In an embodiment, the second retaining portion defines a pocket configured to retain a portion of a portable electronic device. In an embodiment, the one or more securing members comprise a threaded surface.

Another embodiment of a security apparatus for securing a portable electronic device for retail display includes a base assembly extending along a base assembly axis and configured to couple to a display fixture. The base assembly includes a first base assembly portion and a second base assembly portion moveably coupled to the first base assembly portion and moveable along the base assembly axis. A body extends along a body axis and is structured to couple to one of the first and second base assembly portions. The security apparatus further includes a first securing member coupled to the body and a second securing member coupled to the body, where at least one of the first and second securing members is structured to move along the body axis relative to the body. The first and second securing members each include a body engagement portion including a lock member and a device engagement portion structured to at least partially surround a portion of the portable electronic device. The base assembly axis intersects the body axis and the second portion of the base assembly is structured to move along the base assembly axis to move the body along the base assembly axis.

In another embodiment, the security apparatus includes a base assembly extending along a base assembly axis and structured to couple to a display fixture. The base assembly includes a base portion that is structured to move along the base assembly axis. The security apparatus further includes a body extending along a body axis and structured to couple to the base portion. A first securing member is coupled to the body and a second securing member is coupled to the body. At least one of the first and second securing members is structured to move along the body axis relative to the body. The first and second securing members each include a device engagement portion that at least partially surrounds a portion of the portable electronic device. The base portion is structured to move along the base assembly axis to move the body along the base assembly axis.

In an embodiment, the base assembly axis intersects the body axis. In an embodiment, the body is moveably coupled to the base portion and wherein the first and second securing members are structured to pivot about the body axis. In an embodiment, the device engagement portion includes two retainers structured to engage the portable electronic device. In an embodiment, the two retainers are structured to move in a first direction towards each other and in a second direction away from each other. In an embodiment, the device engagement portion further includes at least one engagement portion lock structured to inhibit movement of the retainers relative to each other. In a further embodiment, the base assembly further includes an anchor portion pivotally coupled to the base portion and structured to contact the display fixture.

An embodiment of a method of manufacturing a security apparatus for securing a portable electronic device includes structuring a base assembly to: (i) extend along a base assembly axis; (ii) couple to a display fixture; and (iii) comprise a base portion configured to move along the base assembly axis. A body is structured to extend along a body axis and to couple to the base portion. A first securing member is structured to couple to the body and a second securing member is structured to couple to the body. At least one of the first and second securing members is structured to move along the body axis relative to the body. The first and second securing members are structured to each comprise a device engagement portion to at least partially surround a portion of the portable electronic device. The base portion is further structured to move the body along the base assembly axis.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

DETAILED DESCRIPTION

The following discussion relates to various embodiments of a tablet security apparatus. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "upper", "lower", "forward", "rearward", "interior", "exterior", "front", "back", "top", "bottom", "inner", "outer", "first", "second", and the like are not intended to limit these concepts, except where so specifically indicated. The terms "about" or "approximately" as used herein may refer to a range of 80%-125% of the claimed or disclosed value. With regard to the drawings, their purpose is to depict salient features of the tablet security apparatus and are not specifically provided to scale.

Figure 1:
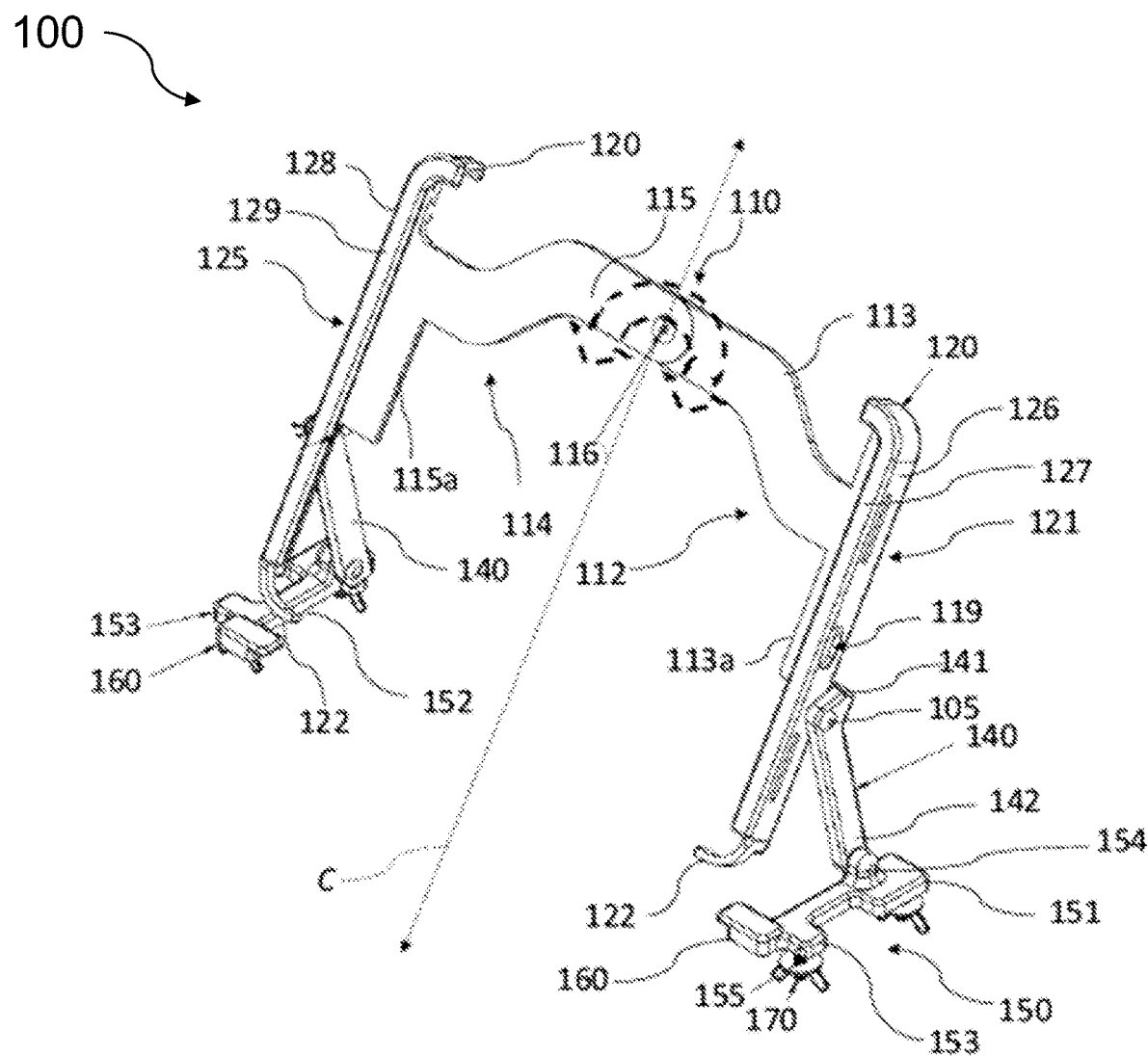
FIG. 1 illustrates a perspective front view of an embodiment of a security apparatus for a portable electronic device.
Figure 2:
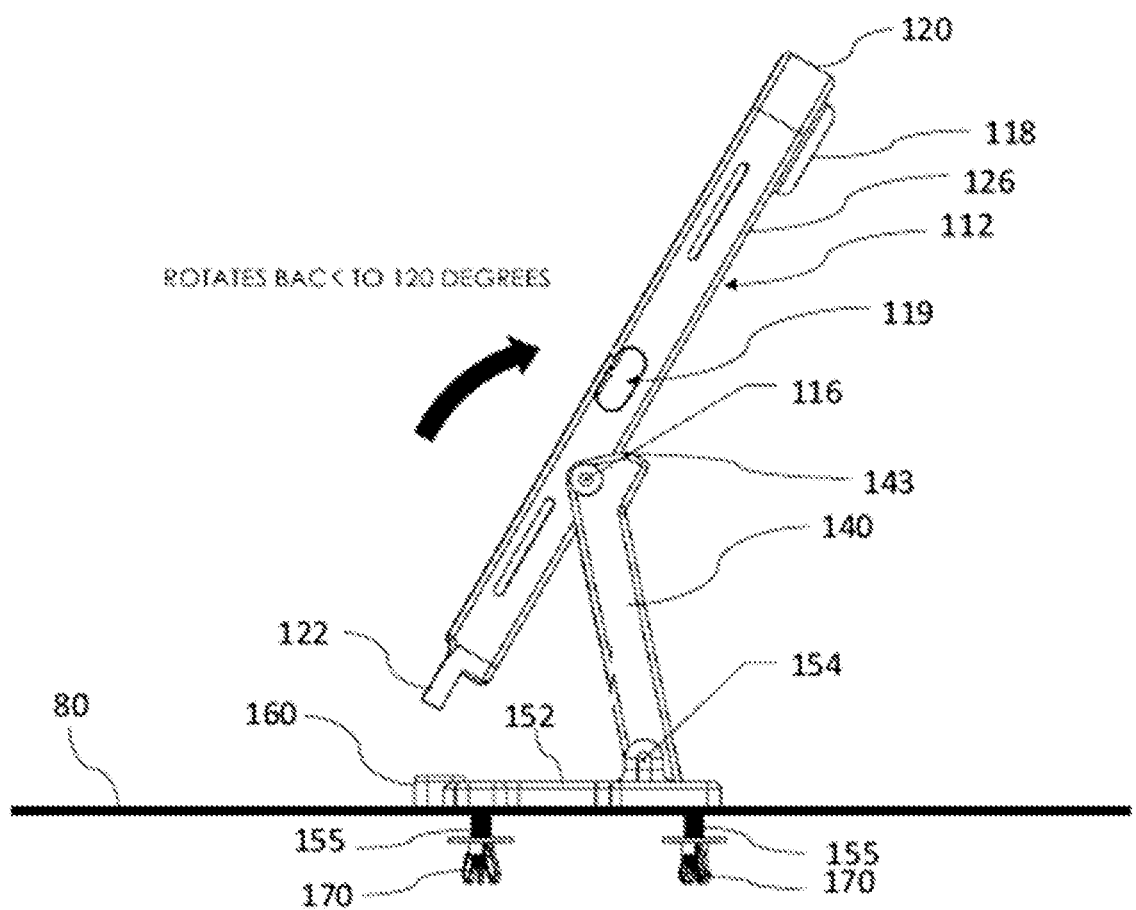
FIG. 2 a left side elevation view of the embodiment of the tablet security apparatus of FIG. 1.

FIGS. 1 and 2 illustrate an embodiment of the tablet security assembly comprising a tablet security apparatus ("security apparatus") 100 without a tablet 50 or detachable keyboard or keyboard accessory 60 installed. FIGS. 3-13 show the security apparatus 100 in various positions while the tablet 50 and the detachable keyboard accessory 60 are installed.

As shown in FIGS. 1 and 2, the security apparatus 100 generally comprises a tablet or display support 110 that is pivotally coupled to a base 150 by one or more support extensions 140. The tablet support 110 includes a first retaining portion 112 and a second retaining portion 114. The first retaining portion 112 comprises a first support 113 and a first brace 113a. The first brace 113a extends from the first support 113 and acts to provide structural rigidity as well as surface for the tablet 50 to rest on when it is installed in the security apparatus 100. The first support 113 and the first brace 113a extend along the same plane. The second retaining portion 114 includes a second support 115 and a second brace 115a. The second brace 115a extends from the second support 115 and provides structural rigidity as well as surface for the tablet 50 to rest on when it is installed in the security apparatus 100. The second support 115 and the second brace 115a extend along the same plane.

The first retaining portion 112 and the second retaining portion 114 are configured to be pivotally coupled together at a pivot point 30. The coupling may be done using a fastening means that enables the first retaining portion 112 and the second retaining portion 114 to pivot relative to each other. The first retaining portion 112 and the second retaining portion 114 exist in an unlocked state and a locked state. In the unlocked state, the first and second retaining portions 112, 114 are enabled to pivot relative to each other. In a locked state, the first and second retaining portions 112, 114 are inhibited from pivoting relative to each other. The pivoting motion acts to move one set of opposing ends of the first and second retaining portions towards each other, while at the same time moving the second set of opposing ends of the first and second retaining portions 112, 114 away from each other, similar to a clam shell opening. The fastening means may comprise a lock that is moved between the locked and unlocked state using a key. In an embodiment, the key is magnetic and locks and/or unlocks the lock via a magnetic field. In another embodiment, the lock comprises a biometric sensor that senses a biometric input, such as a finger print, or retinal scan, and locks and/or unlocks the lock when the biometric input matches a stored biometric input. In still another embodiment, the lock may be controlled using a Bluetooth® key or signals over a Bluetooth® connection or using radio-frequency identification technology.

The first retaining portion 112 further includes a first holder 121 having a side 126 extending from the first brace 113a or the first support 113 along a plane that intersects the plane of the first brace 113a. A lip 127 extends from the side 126 along a plane above the plane of the first brace 113a to create a pocket. The ends 120, 122 of the first holder 121 may be curved, bent, or otherwise pointed towards the center line C. The second retaining portion 114 further includes a second holder 125 having a side 128 extending from the second brace 115a along a plane that intersects the plane of the second brace 115a. A lip 129 extends from the side 128 along a plane above the plane of the second holder 125 or second brace 115a to create a pocket. The ends 120, 122 of the second holder 125 are similar to those of the first holder 121 and may be curved, bent, or otherwise pointed towards the center line C. The first and/or second holders 121, 125 may define one or more openings 119 that allow access to buttons and/or ports of the tablet while the tablet is installed in the security apparatus 100. One or more components of the first retaining portion 112 and the second retaining portion 114 may be formed as a single unitary component.

Still referring to FIGS. 1 and 2, the base 150 comprises a base body 152 having a first end 151 and an second end 153. The embodiments of the security apparatus 100 that are depicted in the figures comprise two identical bases 150 coupled to the tablet support 110 via two support extensions 140 such that it will only be necessary to describe one base 150 and one support extension 140. Of course, other embodiments may comprise bases 150 and/or support extensions 140 that differ from each other in one or more aspects.

In still other embodiments, one or more support extensions 140 couple the tablet support 110 to a single base. A support extension mount 154 is positioned proximate the first end 151 of the base body 152 and a keyboard retainer 160 is positioned proximate the second end 153 of the base body 152. One or more securing members 155 extend from the bottom surface of the base body 152. The one or more securing members 155 may define surface features, such as threads, and are configured to traverse a display fixture or display surface 80 or display fixture. A securing member coupler 170 is configured to couple to and secure the base body 152 to the display surface 80. The securing member coupler 170 may be a wingnut, other nut, or any other means to couple to the securing members 155 and secure the base body 152 to the display surface 80. The securing member couplers 170 secure to the underside of the display surface 80 and cannot be accessed by an unauthorized person since access to the underside of the display surface is inhibited by one or more locked doors or a wall.

A support extension 140 pivotally couples the display support or tablet support 110 to the base 150. A first end 141 of the support extension 140 is pivotally coupled the first holder 121 at a pivot point 105. A fastener may be positioned at the pivot point 105 to couple the support extension 140 to the first holder 121 in a manner that enables the first holder 121 to pivot relative to the support extension 140. The second end 142 of the support extension 140 pivotally couples to the support extension mount 154 of the base body 152. When the base body 152 is secured to the display surface 80, the support extension 140 is configured to pivot relative to the base body 152.

Figure 3:
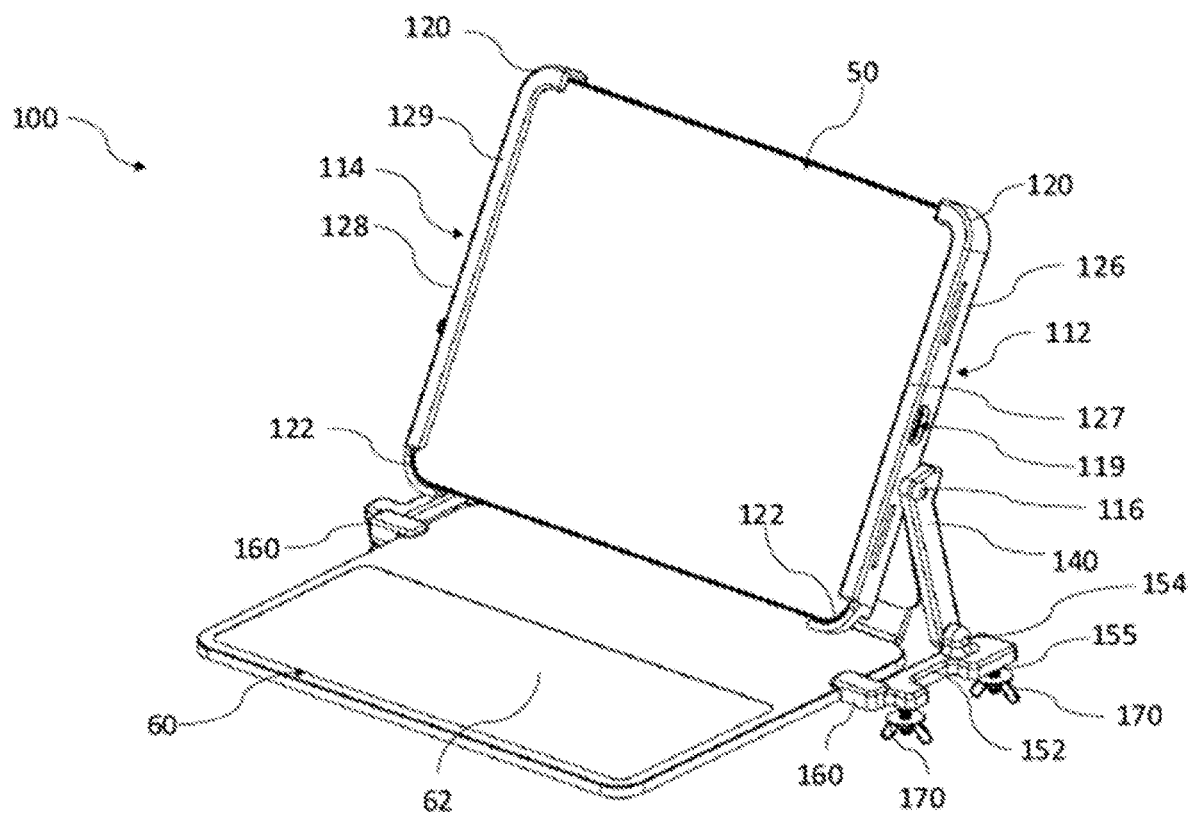
FIG. 3 illustrates a front perspective view of an embodiment of the tablet security apparatus securing a tablet and detachable keyboard in an open position.
Figure 4:
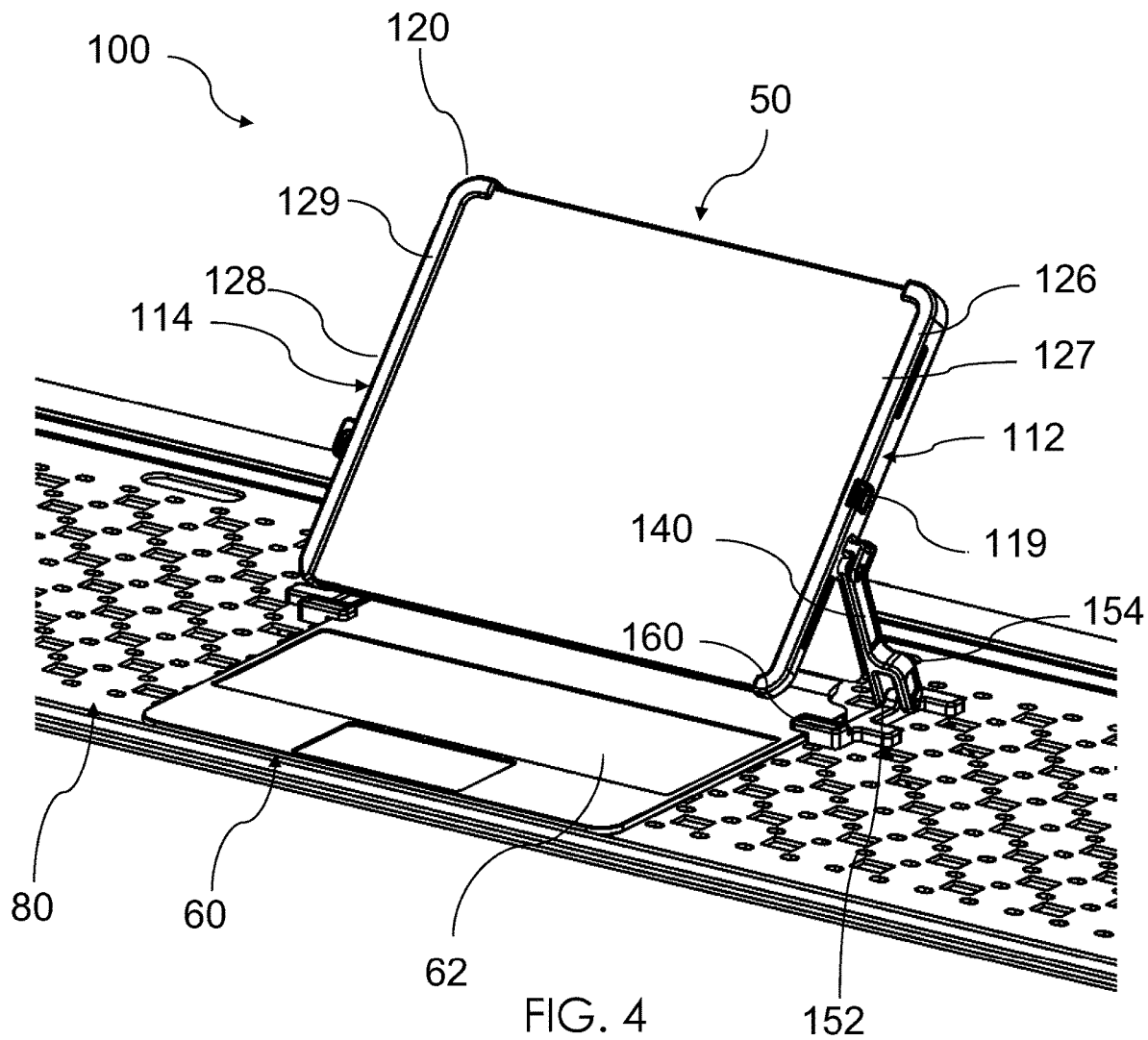
FIG. 4 illustrates a front perspective view of an embodiment of the tablet security apparatus securing a tablet and detachable keyboard in the open position.
Figure 5:
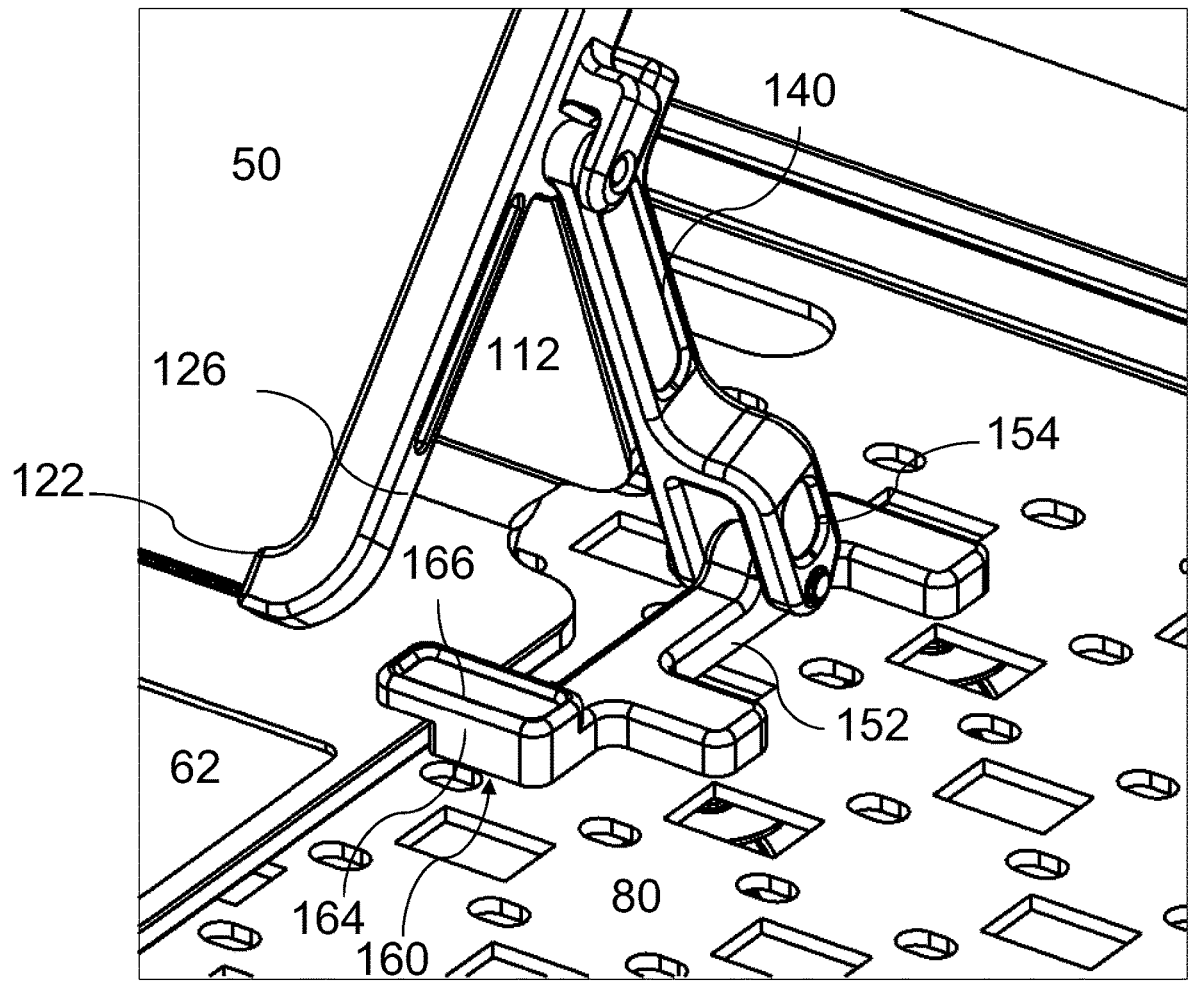
FIG. 5 illustrates a close-up front perspective view of an embodiment of the tablet security apparatus securing a tablet and detachable keyboard in the open position.
Figure 6:
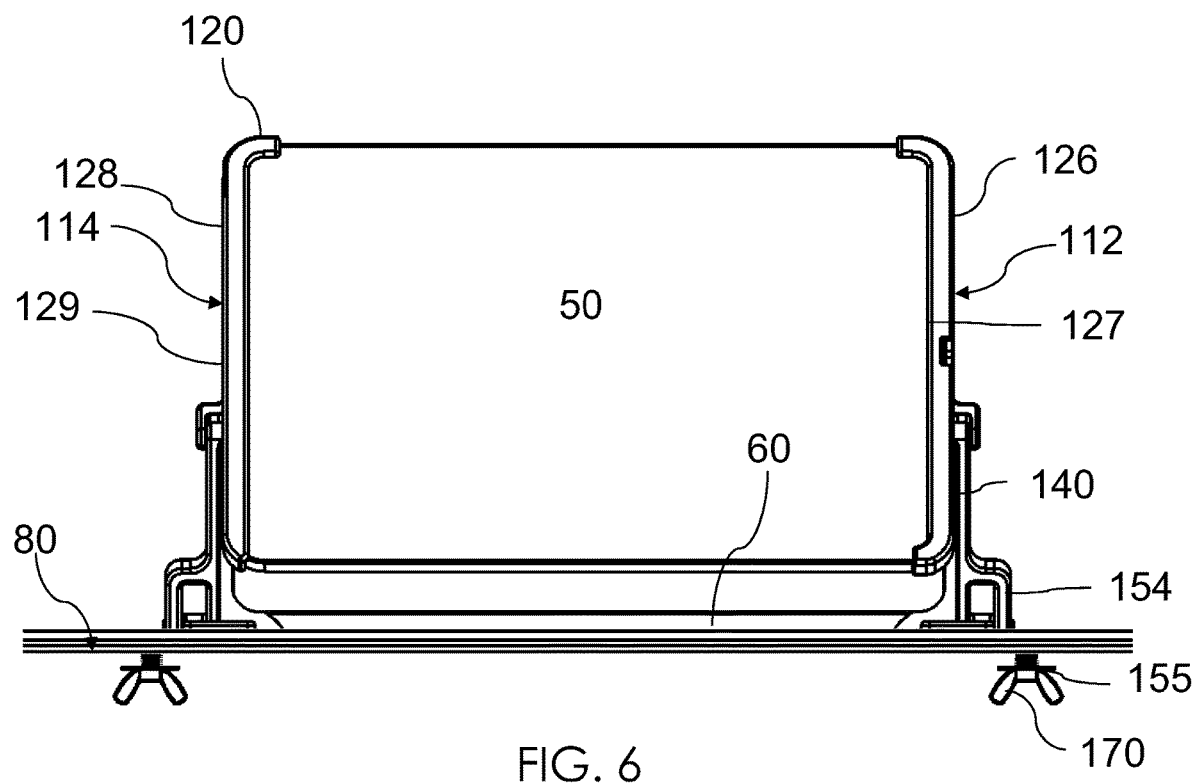
FIG. 6 illustrates a front plan view of an embodiment of the tablet security apparatus securing a tablet and detachable keyboard in the open position.

Turning now to FIGS. 3-13, installation and removal of the tablet 50 and detachable keyboard 60 will not be described along with the functional display capabilities of the security apparatus. In order to install the tablet 50 coupled to the detachable keyboard accessory 60 into the security apparatus 100, the security apparatus 100 is detached from the display surface 80. The lock 116 is then moved to the unlocked state and the curved ends 122 (or 120) of the first and second holders 121, 125 are pivoted away from each other. The tablet 50 with a detachable keyboard accessory 60 is inserted into the tablet support 110 such that the lips 127, 129 and the pocket retain the sides and the tablet 50, and/or at least a portion of the detachable keyboard accessory 60 rests on the first and second braces 113a, 115a. As the tablet 50 with the detachable keyboard accessory 60 in inserted, the curved ends 122 (or 120) of the first and second holders 121, 125 are brought towards each other such that the tablet 50 and a portion of the detachable keyboard accessory 60 "snaps" into tablet support 110. The lock 116 is then moved to the locked state such that the first retaining portion 112 and the second retaining portion 114 cannot move relative to each other. The tablet 50 and detachable keyboard accessory 60 are now installed into and secured in the security apparatus 100. The security apparatus 100 is then secured to the display surface 80 as was described above thereby securing the tablet 50 and detachable keyboard accessory 60 to the display surface 80. The keyboard 62 of the detachable keyboard accessory 60 is capable of resting on the display surface 80 while it is secured in the security apparatus 100. Referring specifically to FIGS. 3-5, security apparatus 100 is in an open position such that the keyboard 62 of the detachable keyboard accessory 60 and the display of the tablet 50 can be used as a laptop computer. The tablet 50 is positioned at an angle α relative to the keyboard 62. In the fully open position, the angle α is about 120° (FIG. 8) and the tablet 50 appears to float above the keyboard 62.

Figure 10:
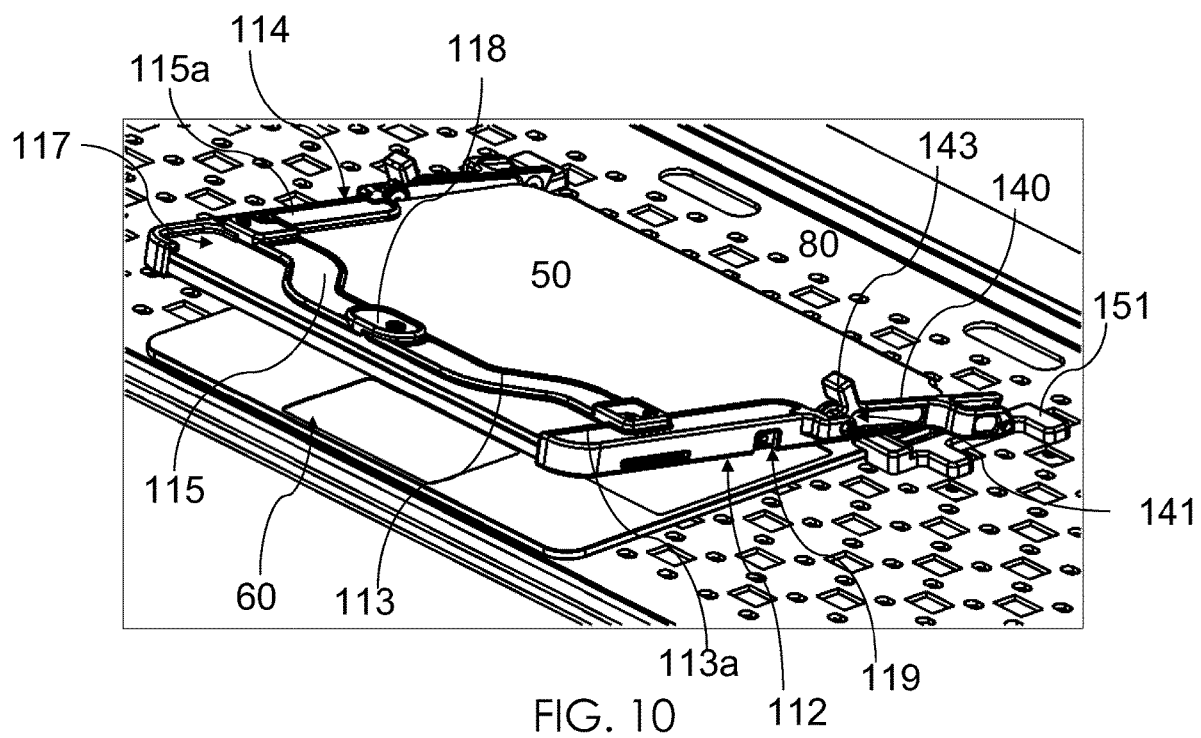
FIG. 10 illustrates a front perspective view of the of the tablet security apparatus securing a tablet and detachable keyboard in a closed position.
Figure 11:
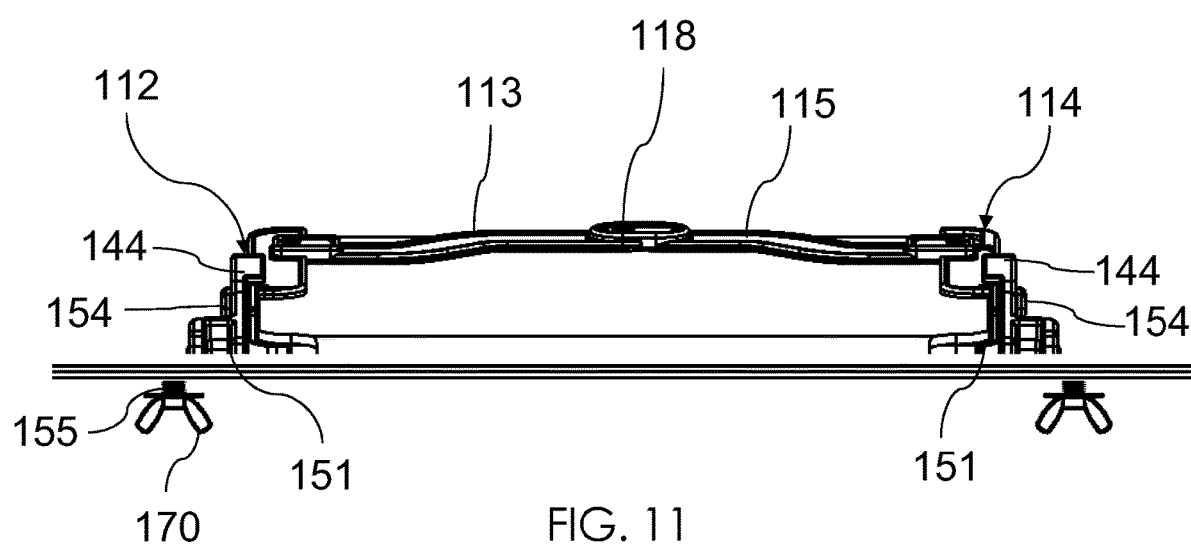
FIG. 11 illustrates a rear perspective view of the tablet security apparatus securing a tablet and detachable keyboard in the closed position.
Figure 12:
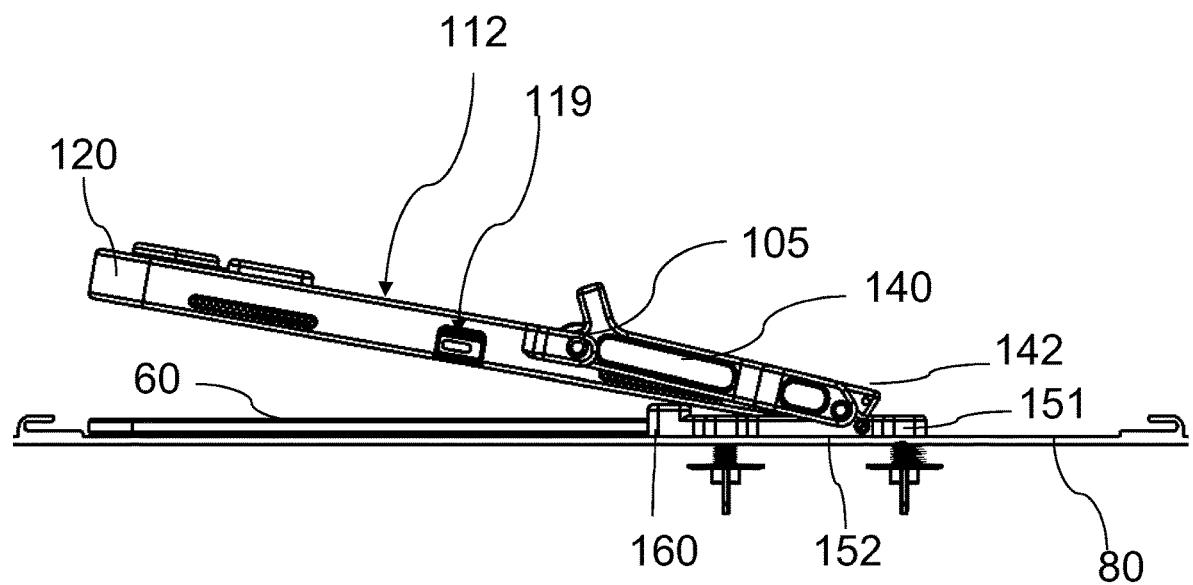
FIG. 12 illustrates a left side elevation view of the tablet security apparatus securing a tablet and detachable keyboard in the closed position.
Figure 13:
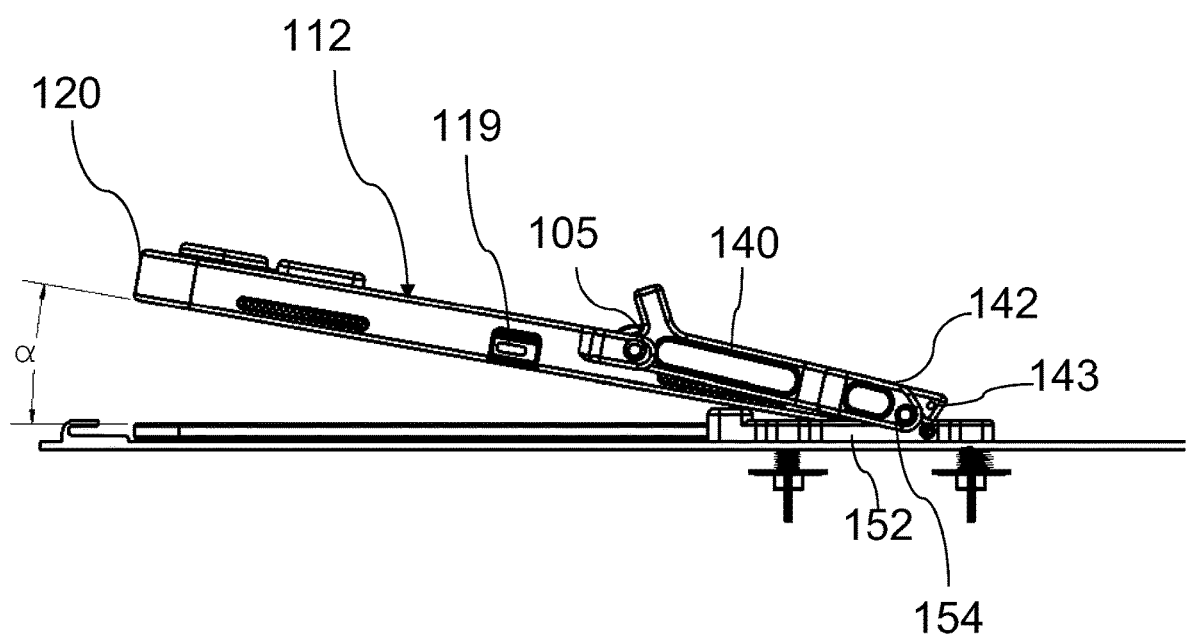
FIG. 13 illustrates another left side elevation view of the tablet security apparatus securing a tablet and detachable keyboard in the closed position.

In the fully open position, the first retaining portion 112 and the second retaining portion 114 contact the stop surface 143 of the support extension 140 (FIG. 10). The stop surface 143 is defined at the first end 141 of the support extension 140. In the open position, the bottom surface 144 of the support extension 140 contacts and rests on the top surface of the base body 152 proximate the first end 151 of the base body 152. The support extension 140 is free to pivot about the support extension mount 154 to vary the position of the support extension 140 and the tablet 50 installed into the tablet support 110 relative to the display surface 80 and the keyboard 62. The tablet support 110 is coupled to the first end 141 of the support extension 140 and further configured to pivot relative to the support extension 140. The pivoting is meant to correspond to the movement of the detachable keyboard accessory 60 and its corresponding components relative to the tablet as the customer would experience during personal use.

Once the tablet 50 is installed in the tablet support 110 of the security apparatus 100, a portion of the detachable keyboard accessory 60 is also secured by the tablet support 110 such that the keyboard 62 is securely "tethered" to the tablet 50. In this embodiment, the keyboard 62 is capable of moving relative to the display surface 80, however as specifically shown in the embodiment of FIG. 5, the base body 152 may comprise a keyboard retainer 160 including a mounting block 164 that extends above the plane of the upper surface of the base body 152. A retaining element 166 extends away from the base body 152 and partially over and/or contacting the keyboard 62 to inhibit movement of the keyboard 62 relative to the display surface 80.

Figure 7:
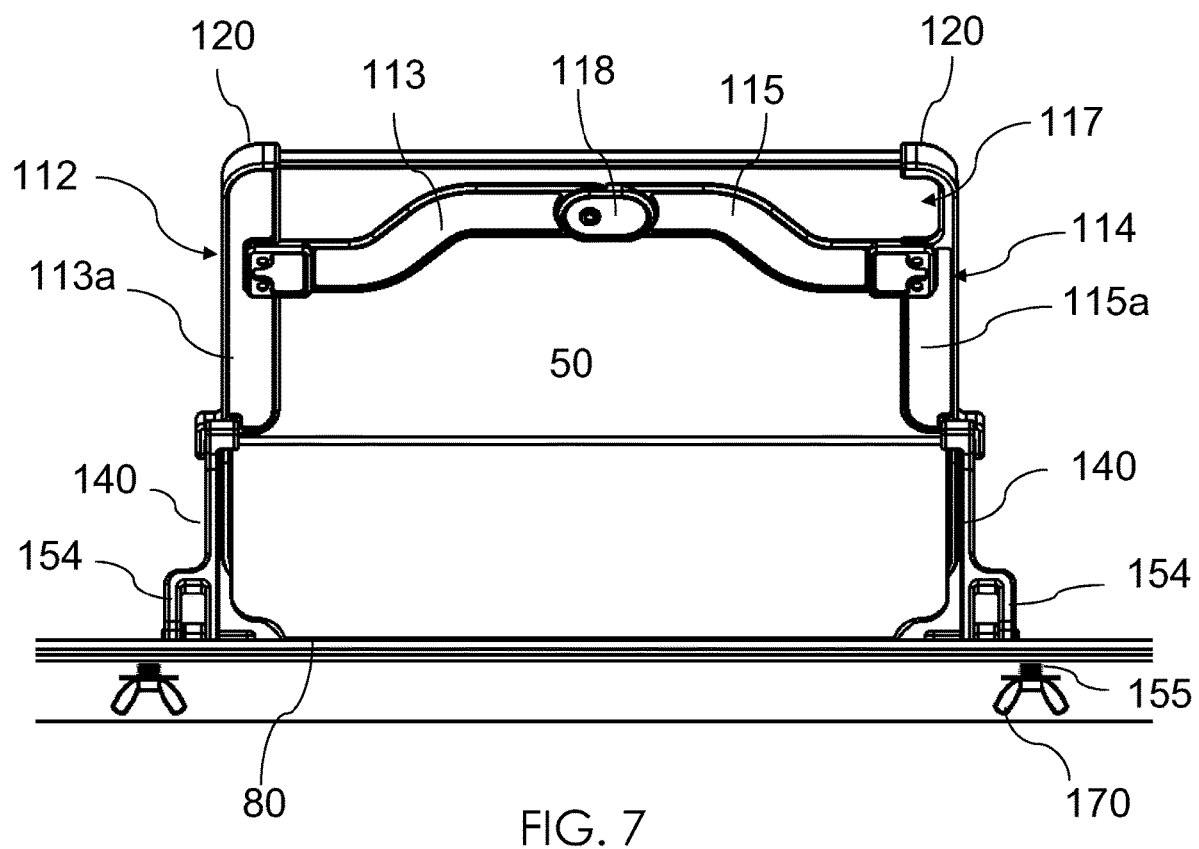
FIG. 7 illustrates a rear perspective view of the tablet security apparatus securing a tablet and detachable keyboard in the open position.
Figure 8:
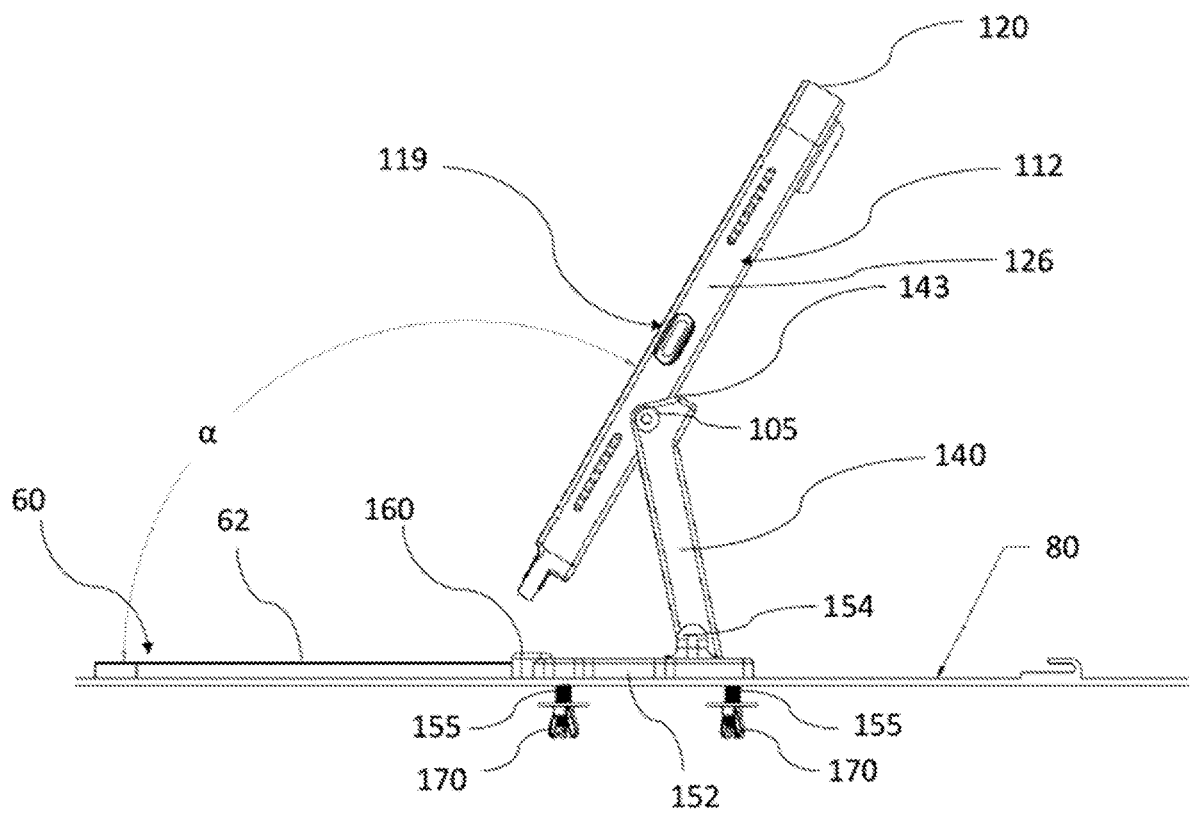
FIG. 8 illustrates a left side elevation view of the tablet security apparatus securing a tablet and detachable keyboard in the open position.
Figure 9:
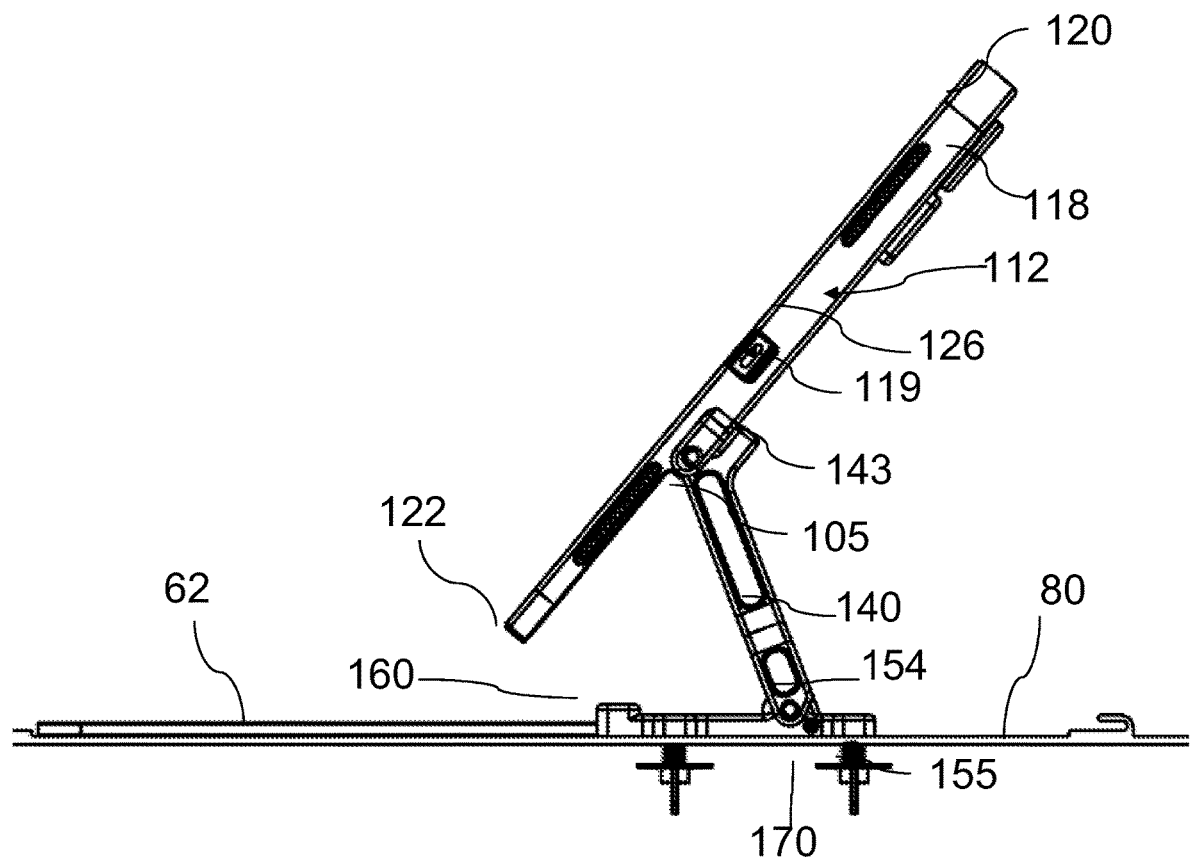
FIG. 9 illustrates another left side elevation view of the tablet security apparatus securing a tablet and detachable keyboard in the open position.

Referring to FIG. 7, the lock 116 may comprise a covering 118 on the back side facing away from the tablet 50 in order to inhibit tampering and theft. The second brace 115a defines a cut-out 117 to accommodate the camera and prevent damage to the camera lens or lens cover as well as to allow the customer to test the quality of the tablet's camera while is it securely displayed.

The security apparatus 100 is also capable of displaying the tablet 50 and detachable keyboard accessory 60 in a closed position. Referring specifically to FIGS. 10-13, the tablet support 110 can be pivoted towards the keyboard 62 via the support extension 140 such that the display of the tablet 50 faces the keyboard 62. In the embodiments shown, the security features of the security apparatus 100 such as the first and second lips 127, 129 and the keyboard retainers 160, inhibit the tablet 50 from being brought into contact with the keyboard 62 such that the angle α is 0°. In the completely closed position, the angle is about 8°. In embodiments that do not have keyboard retainers 160, the keyboard 62 of the detachable keyboard accessory 60 is able to be pivoted towards the tablet 50, using the hinge that is part of the detachable keyboard accessory 60, into a closed position such that the angle may be less than 8°.

In order to remove the tablet 50 and detachable keyboard accessory 60 from the security apparatus 100, the security apparatus 100 is detached from the display surface 80 and the lock 116 is moved to the unlocked state. The first and second retaining portions 112, 114 are now able to be moved relative to each other to dislodge the tablet 50 and a portion of the detachable keyboard accessory 60 from the tablet support 110. Detaching the security apparatus 100 from the display surface 80 further acts to free the keyboard 62 from the keyboard retainer(s) 160.

The security apparatus 100 may be configured to accommodate different sizes of tablet 50 and detachable keyboard accessory 60. In an embodiment, the first and second holders 121, 125 may be capable of being extended away from (or closer to) each other to accommodate different sized tablets 50. In addition, the holders 121, 125 may further be capable of being adjusted to move their ends 120, 122 farther apart from (or closer to) each other.

Turning generally to FIGS. 14-22, the security assembly is part of a security system comprising a mounting plate 200 or adapter plate or support plate configured to couple to the security apparatus 100 at one or more coupling portions 232. Each coupling portion 232 may each include an extension or an opening configured to removably couple to the security apparatus 100. In other embodiment, the coupling may be achieved or aided by using one or more mechanical fasteners, or welded joints. In another embodiment, one or more pieces of the mounting plate 200 and the security apparatus 100 may be formed as a single unitary component. The mounting plate 200 may comprise a generally planar frame 210 including a plurality of perimeter supports 212, 214, 216, 218 and a plurality of supplemental supports 211, 213, 215, 217. One or more spaces 206 may be defined between the perimeter supports 212, 214, 216, 218 and/or the supplemental supports 211, 213, 215, 217 that at least partially traverse the mounting plate 200. Of course alternate embodiments of the mounting plate 200 may have fewer or more supports as required. In an embodiment, the mounting plate 200 may not comprised defined supports and instead may be a single solid piece with no defined spaces 206.

Figure 14:
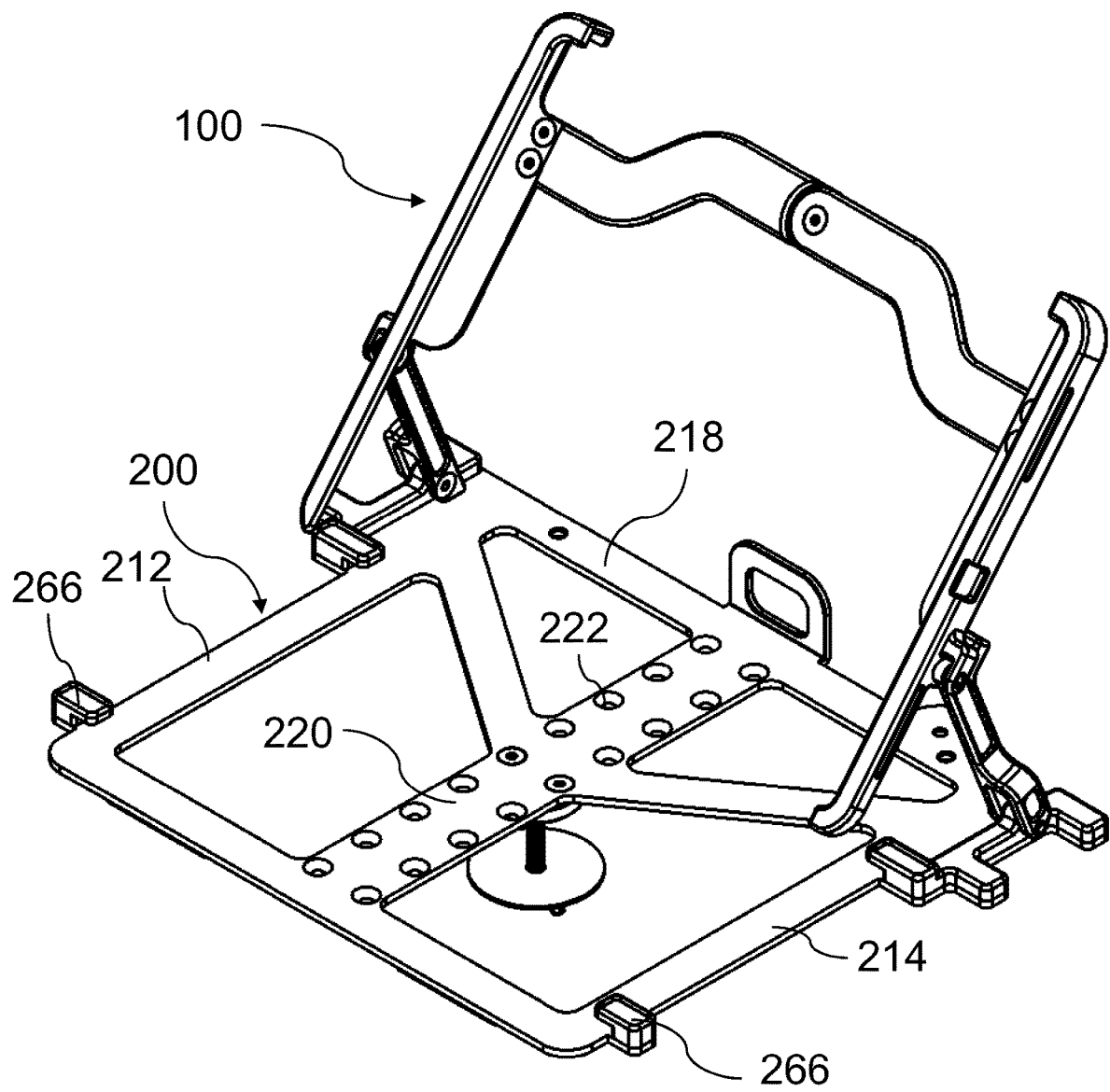
FIG. 14 illustrates an embodiment of the tablet security apparatus coupled to a mounting plate.
Figure 15:
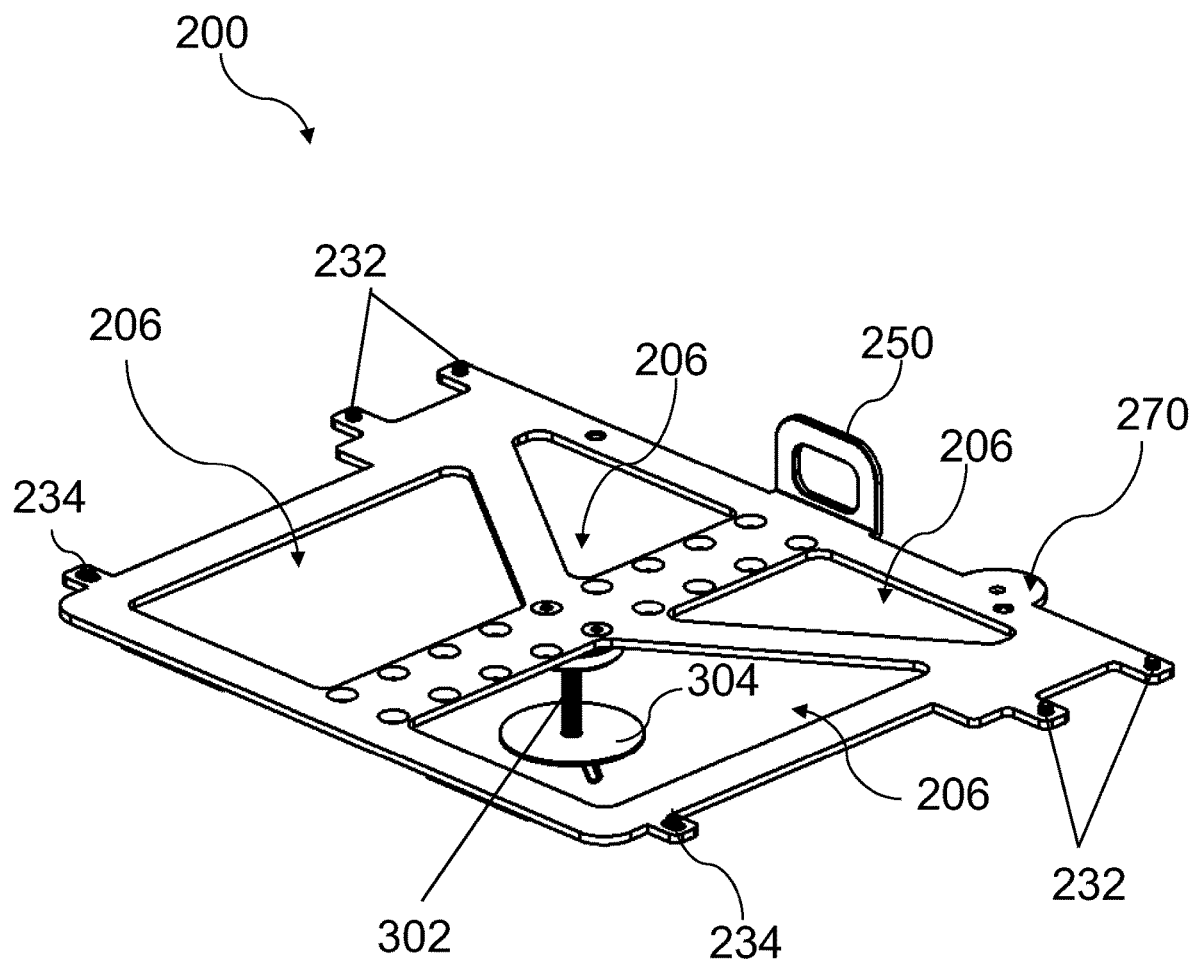
FIG. 15 illustrates a top perspective view of an embodiment of the mounting plate.
Figure 16:
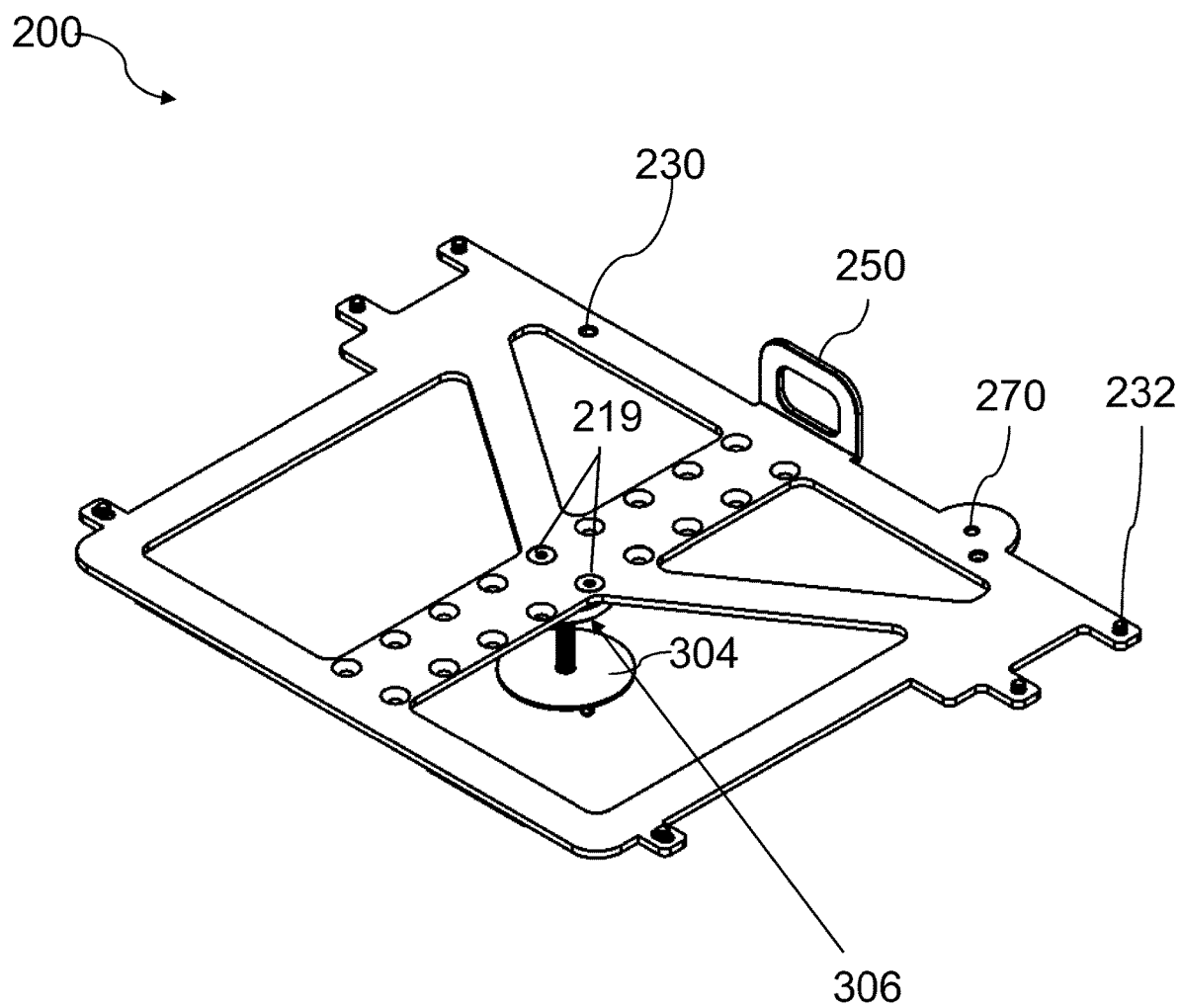
FIG. 16 illustrates another illustrates a top perspective view of an embodiment of the mounting plate.

As illustrated particularly in FIG. 14, the mounting plate 200 may further comprise one or more additional retaining elements 266 configured to retain a portion of the portable electronic device such as a detachable keyboard (or a keyboard portion of a laptop computer). The one or more additional retaining elements 266 may be separately coupled to the mounting plate 200 via one or more supplemental coupling portions 234. In this embodiment, the one or more supplemental coupling portions 234 may each include an extension or an opening configured to removably couple or aid in removably coupling to the one or more additional retaining elements 266 to the support plate 200. In an embodiment, the or more additional retaining elements 266 are formed with the mounting plate 200 as a single unitary component.

When the security apparatus 100 is coupled to the mounting plate 200, the mounting plate 200 may be used to anchor the security apparatus 100 to a display fixture 80 instead of anchoring the security apparatus 100 directly to the display fixture 80 as has been described above. Accordingly, the mounting plate 200 may comprise or otherwise define one or more coupling features that enable or aid in coupling the mounting plate 200 to the display fixture 80. For example, one or more of the perimeter and/or supplemental supports 211, 212, 213, 214, 215, 216, 217, 218 may define through holes 230 configured to accept a fastener, such as a bolt, wire, or any suitable fastener to couple the mounting plate 200 to the display fixture 80. In other embodiments, the coupling features may include coupling extensions (similar to the securing members 155) configured to be coupled to the display surface 80, such as with a securing member coupler 170. In an embodiment, the plurality of supplemental supports 211, 213, 215, 217 may be joined together, fused together or otherwise come together at an area 280 away from the plurality of perimeter supports 212, 214, 216, 218. As shown in the figures, the area 280 may be configured to receive one or more fastening members 240, such as standardized bolts, screws, or any other fastening means that is capable of removably coupling the mounting plate 200 to the display fixture 80.

The mounting plate 200 may be specifically configured to couple to a fastener 300 that comprises a coupling interface 306 that may removably coupled to the mounting plate 200 using one or more fastening members 240, and a threaded extension 302 extending from the coupling interface 306. The threaded extension 302 traverses the display surface 80 and a securing member 308, such as a nut, is configured to engage a free end of the threaded extension 302 and be tightened to secure the mounting plate 200 to the display surface 80. In an embodiment one or more washers or spacers 304 may be positioned to contact the securing member 308 and/or the coupling interface 306 when the fastener 300 is installed. In an example, the fastener 300 may be a 39-40 mm adapter to secure to a display fixture 80 that is exclusively used by specific retailers.

Figure 17A:
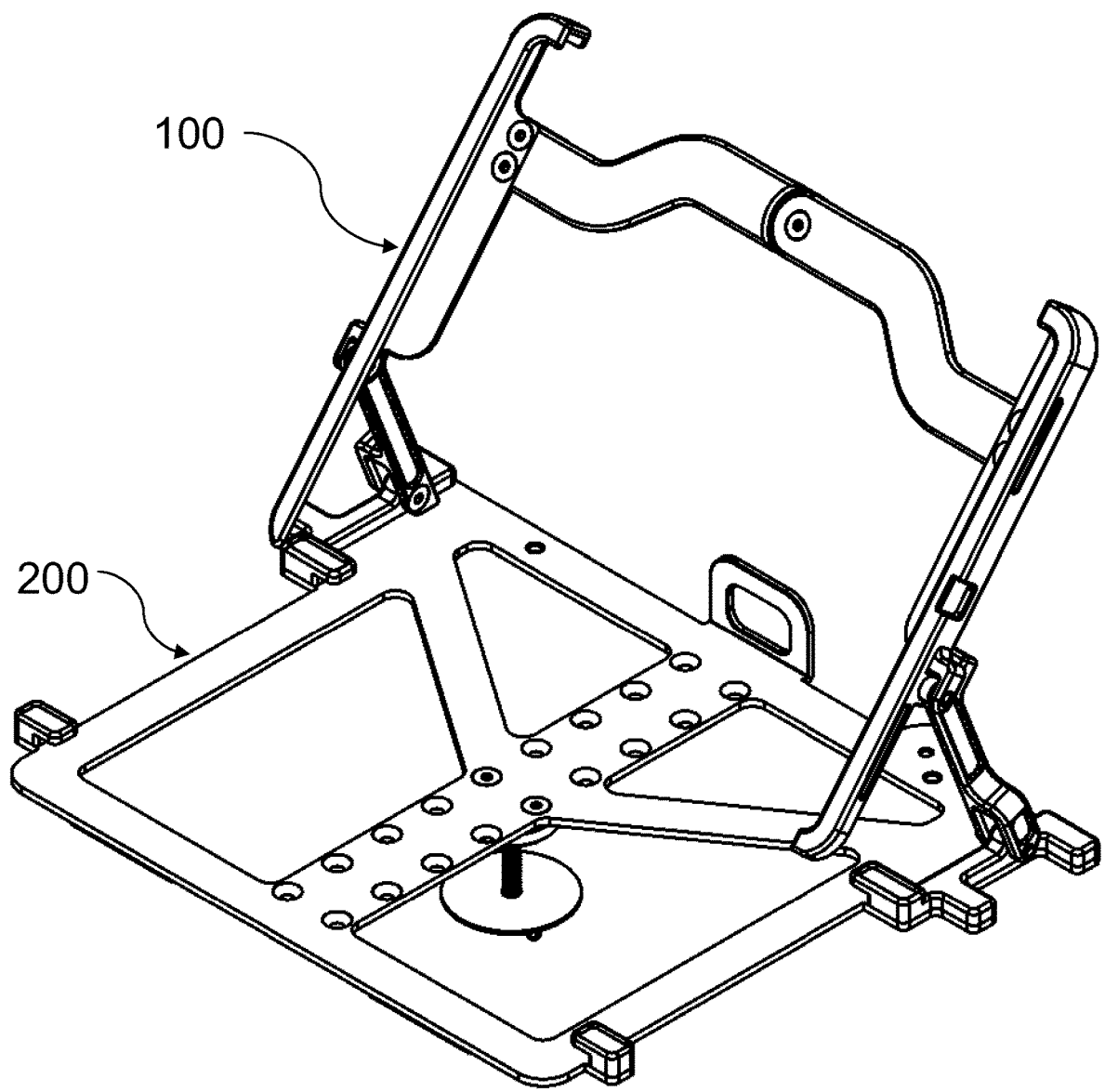
FIG. 17A illustrates a perspective view of another embodiment of the security apparatus.
Figure 17B:
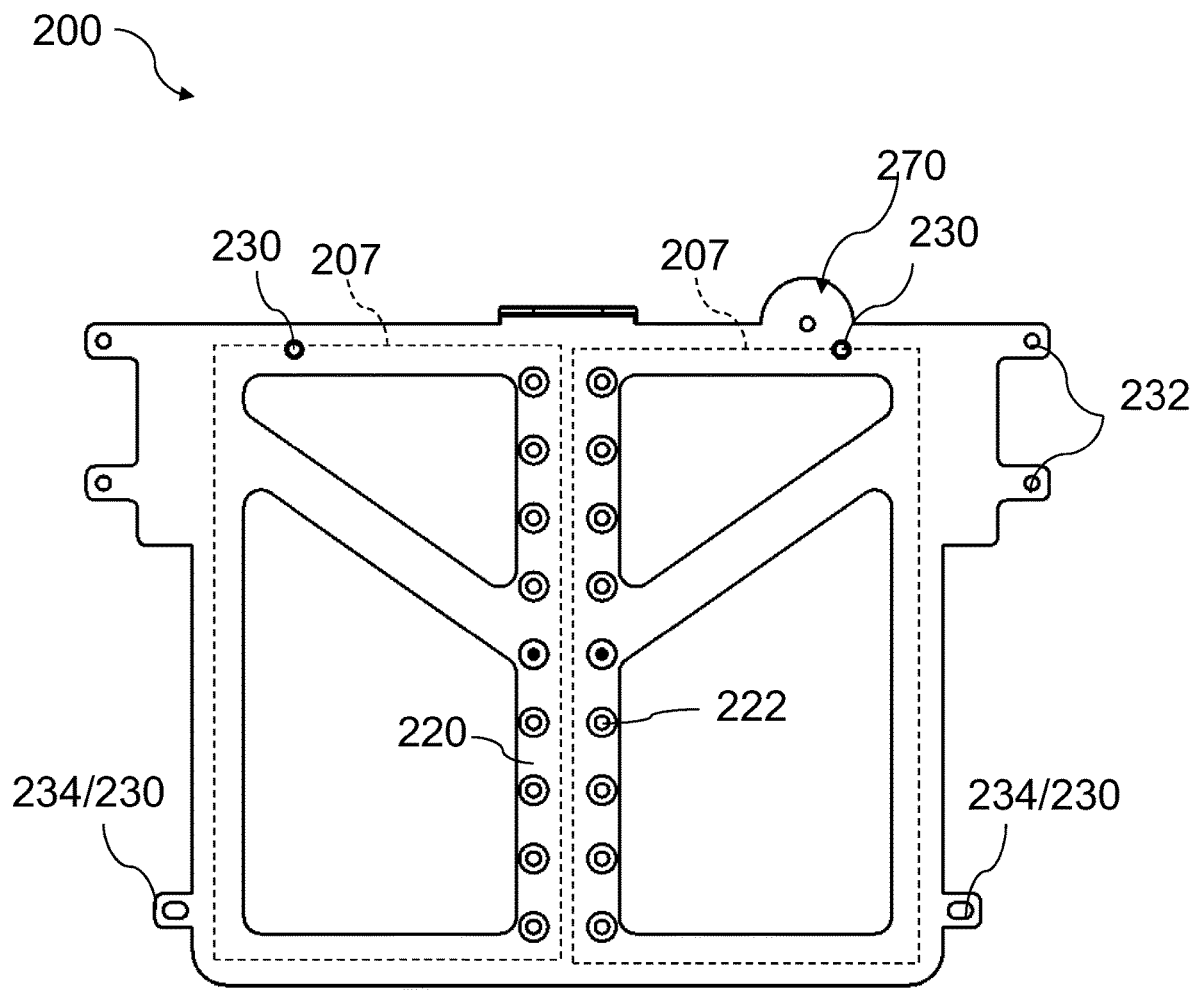
FIG. 17B illustrates a top plan view of an embodiment of a mounting plate comprising a central support.
Figure 18:
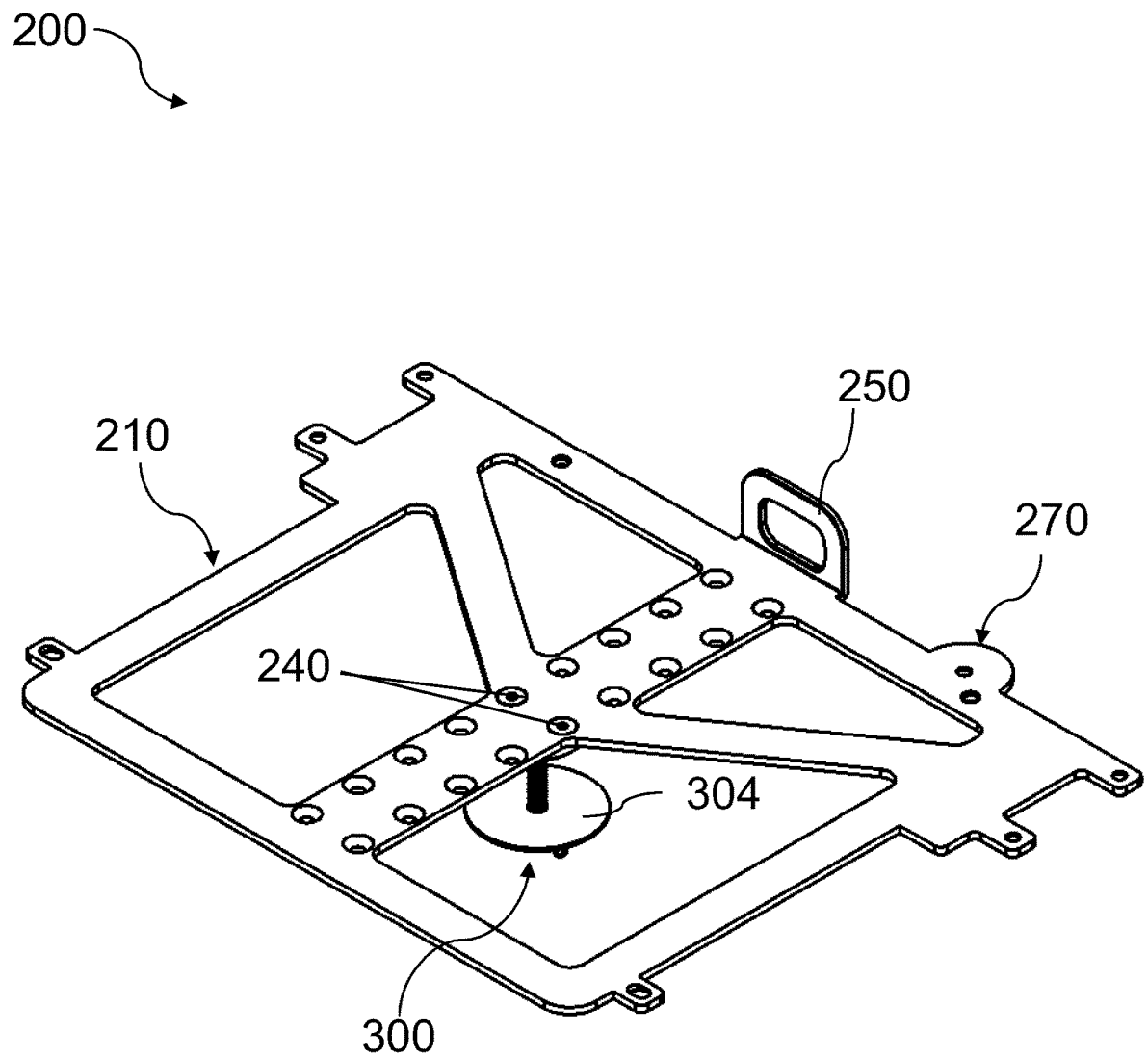
FIG. 18 illustrates a top perspective view of the embodiment of the mounting plate of FIG. 17.
Figure 19:
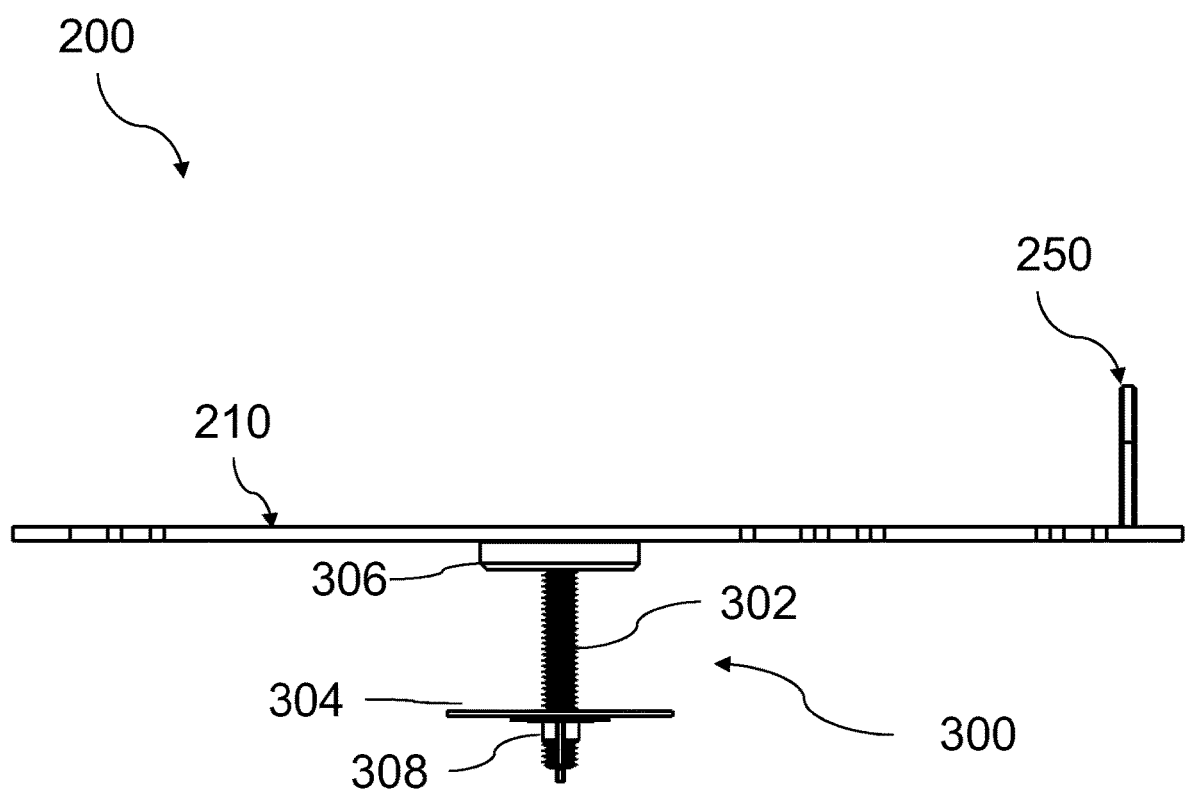
FIG. 19 illustrates a side elevational view of the embodiment of the mounting plate of FIG. 17.

As illustrated in the embodiments of FIGS. 17 and 18, the frame 210 of the mounting plate 200 may further or alternatively comprise a central support 220 that generally bisects the perimeter shape of the frame 210. For example, the perimeter shape may approximately define a square such that the central support 220 bisects the square to form two rectangular sections 207 (FIG. 17) defined by the perimeter and the central support 220. The central support 220 defines a plurality of through holes 222 that traverse the central support 220 and are configured to enable the mounting plate 200 to be coupled to a display fixture 80 using one or more fastening members 240 (or fastener 300). The plurality of through holes 222 enable flexibility in the positioning of the mounting plate 200 in relation to any pre-positioned or pre-formed hole or couplers on the display fixture 80. In other embodiments of the mounting plate 200, the central support 220 may be alternately positioned such that is does not bisect the perimeter shape of the frame 210.

The mounting plate 200 may further or alternatively comprise one or more anchors or mounting eyelets 250 configured to enable the mounting plate 200 to be coupled to a tether 350 (FIG. 20), which is in turn anchored to the display fixture 80. The one or more mounting eyelets 250 may be separate components that are removably coupled to the mounting plate 200 or they may be formed as a single unitary component with the mounting plate 200. The tether 350 may comprise a length of flexible material, such as cord or wire that is coupled to the display fixture 80 at one end and couple to the mounting eyelet 250 at an opposing end. In an embodiment, the opposing end of the tether 350 may include a locking member (not shown) configured to enable fast coupling and decoupling of the mounting plate 200 to the tether 350. When the mounting plate 200 is coupled to the tether 350, the mounting plate 200 and the coupled security apparatus 100 may be picked up or otherwise moved together relative to the display fixture 80 while still enabling the portable electronic device that is secured within the security apparatus 100 to be protected from theft. In other embodiments, the one or more anchors may secure the mounting plate 200 to the display fixture 80 such that the mounting plate 200 is inhibited from moving relative to the display fixture 80.

The plurality of perimeter supports 212, 214, 216, 218 and the plurality of supplemental supports 211, 213, 215, 217 may each comprise a bottom surface that contributes to the entire bottom surface of the mounting plate 200 that are configured to face and/or contact the display fixture 80 when the mounting plate 200 is in proper use. A portion of the entire bottom surface may have a double-sided tape 180 (FIG. 21), or other such adhesive coated substrate, affixed to it and is configured to adhesively couple the mounting plate 200 to the display fixture 80. Accordingly, the embodiments of the mounting plate 200 illustrated in the FIGS. 14-22 are capable of being secured or coupled to the display fixture 80 in several different manners such that a retailer is able to choose the manner of securing the mounting plate 200 that best suites the particular retail setting and portable electronic device being secured.

Figure 20:
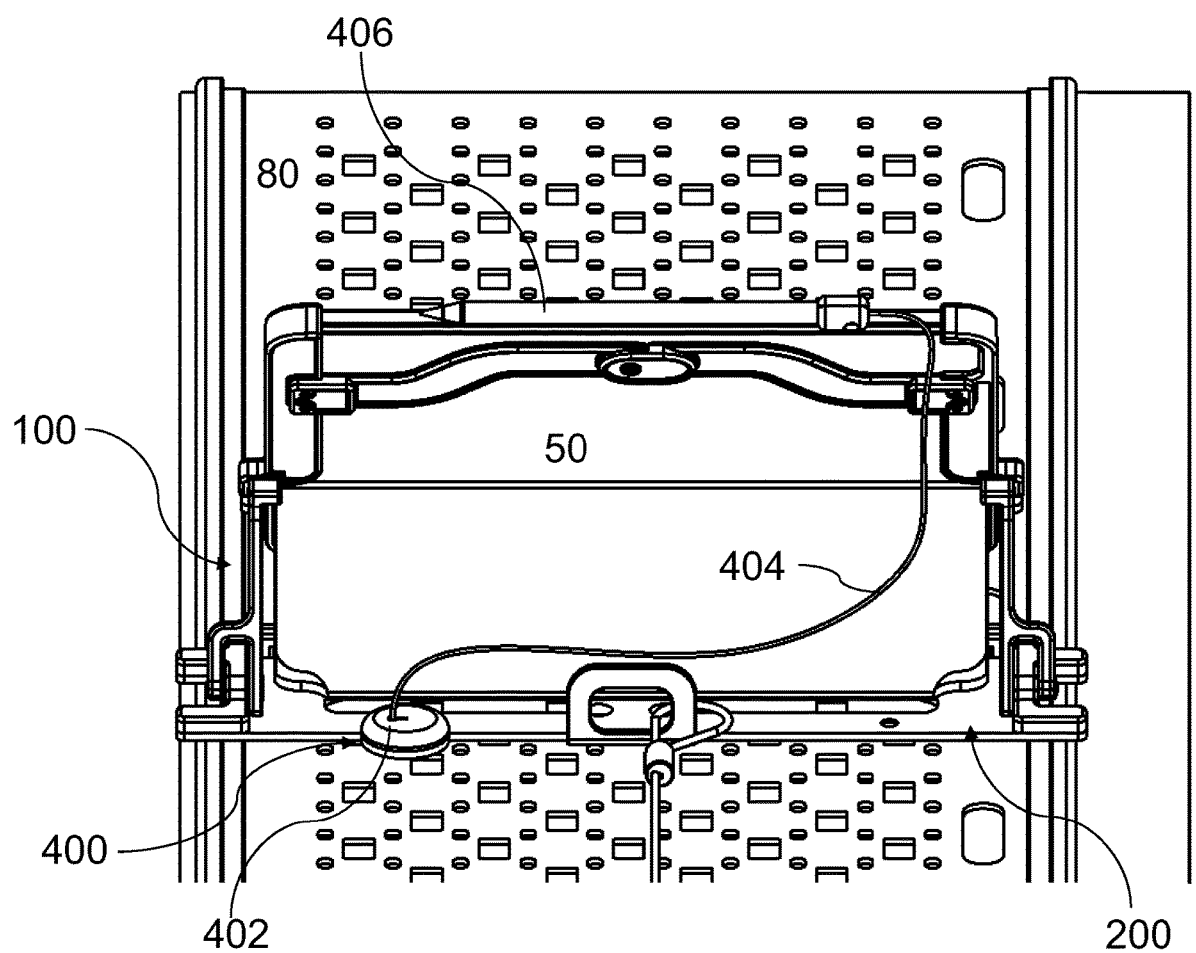
FIG. 20 illustrates an embodiment of the mounting plate coupled to an embodiment of the tablet security apparatus and secured to a display fixture via a tether cable.
Figure 21:
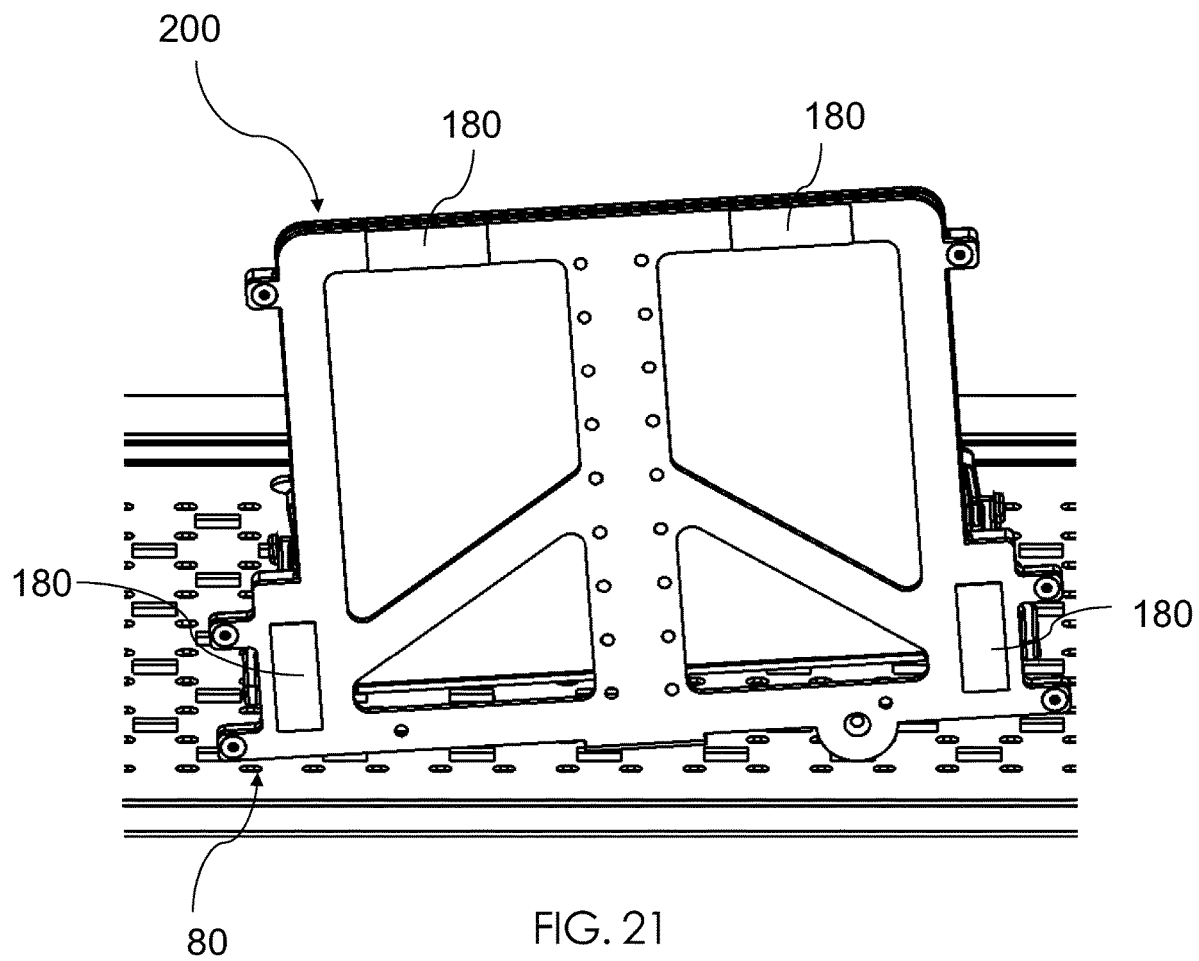
FIG. 21 illustrates a bottom perspective view of an embodiment of the mounting plate with a plurality of adhesive contacts for coupling the mounting plate to a display surface.
Figure 22:
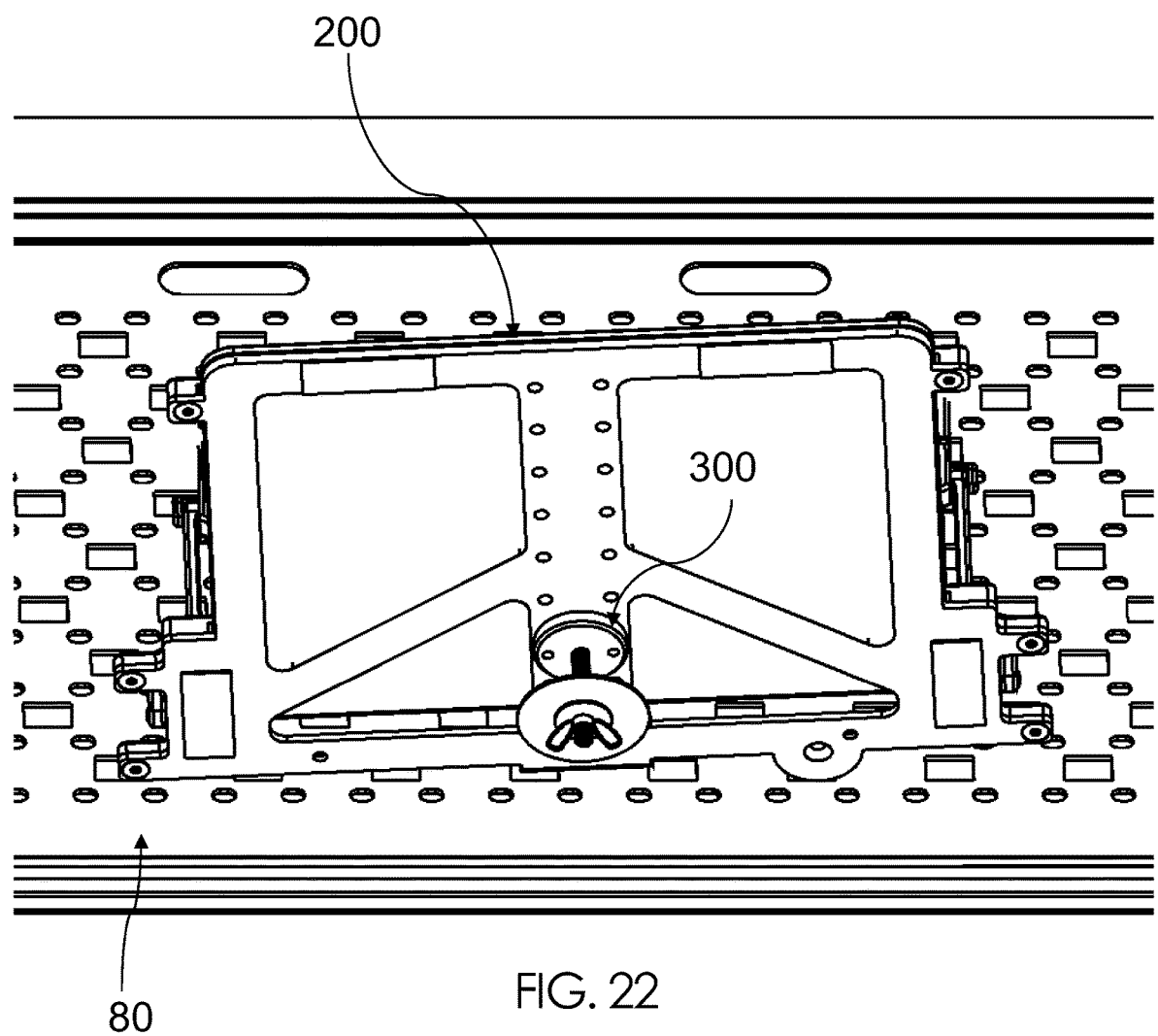
FIG. 22 illustrates a bottom perspective view of an embodiment of the mounting plate with a fastener configured to couple the mounting plate to a display surface.
Figure 23:
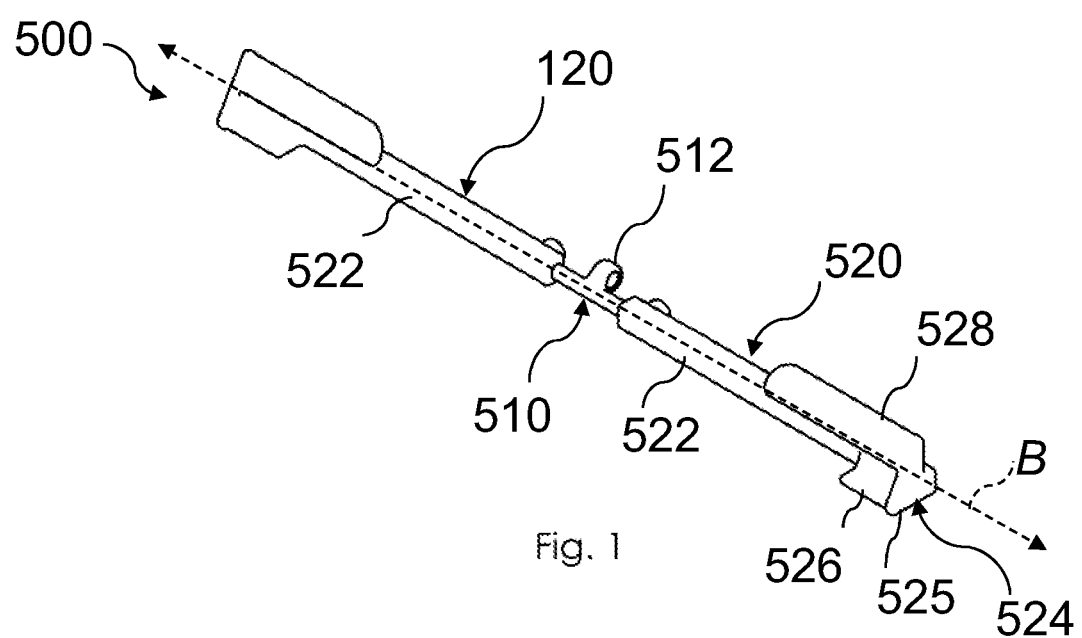
FIG. 23 illustrates a perspective view of another embodiment of a table top security apparatus for a portable electronic device.

The mounting plate 200 may further be enabled to simultaneously couple or secure one or more accessories to be used with the portable electronic device being secured by the security apparatus 100 coupled to the mounting plate 200. Accordingly, the mounting plate 200 may further comprise one or more accessory mounting portions 270. For example, in FIG. 20, an accessory 400 such as an Apple® Pencil or other stylus, may be coupled to the mounting plate 200 at the accessory mounting portion 270 such that it may be used alongside an iPad® that is secured within the security apparatus 100 that is also coupled to the mounting plate 200. As shown in FIG. 20, the stylus accessory 400 comprises a base or holder 402 coupled or otherwise secured to the accessory mounting portion 270 and a stylus implement 406 coupled to the base 402 with a wire, or cord 404. Accordingly, the accessory that is mounted to the mounting plate 200 may be moved relative to the display fixture 80 with the mounting plate 200 and the security apparatus 100.

In order to secure a portable electronic device, such as a tablet or display with keyboard accessory 60, within the security apparatus 100, the first and second retaining portion 112, 114 are in the unlocked state and pivoted relative to each other to accept the tablet. The first and second retaining portions 112, 114 are then pivoted relative to each other to retain two or more sides of the tablet. The first and second retaining portions are then moved to the locked state such that they are inhibited from moving relative to each other. The keyboard accessory 60 is then positioned such that the base 150 contacts the keyboard accessory 60. The base 150 is then coupled to a display fixture 80 using the securing member couplers 170. The keyboard accessory 60 is secured by being trapped between a portion of the base 150 and the display fixture 80. In some embodiments, the keyboard accessory 60 is further retained between the first and second retaining portions 112, 114. The tablet is secured between the first and second retaining portions 112, 114 and is able to be pivot relative to the display fixture 80 (and hence the secured keyboard accessory 60) while still being retained by the first and second retaining portions 112, 114.

When a security system is used comprising a security apparatus 100 and a mounting plate 200, the tablet and keyboard accessory 60 is secured within the security apparatus 100 as discussed above. Instead of securing the base 150 of the security apparatus to the display fixture 80, the base 150 is secured to the mounting plate 200. In an embodiment, the base 150 is secured to the mounting plate 200 using the securing member couplers 170. In turn, the mounting plate 200 is secured to the display fixture 80 using one or more fasteners or a tether/anchor system. In this manner, secured devices may be easily and quickly removed from secure display and replaced.

The embodiments of the security apparatus 100 and mounting plate 200 may further comprise an alarm. In an embodiment, the alarm may be triggered by a pressure change, such as by removing a portable electronic device form the security apparatus 100 and/or the mounting plate 200. In another embodiment, the alarm may be triggered by unlocking the security apparatus 100 or otherwise opening the security apparatus 100 or separating the security apparatus 100 from the mounting plate 200 and/or the display fixture 80. In other embodiments, the alarm may be activated in response to damage to, removal of, or tampering with the security apparatus 100 and/or the mounting plate 200. The alarm may comprise an audio, visual, and/or haptic signal.

Now referring to FIGS. 23-27, another embodiment of the security apparatus 500 is shown and is configured for securing portable electronic devices, such as laptop computers. As shown, the security apparatus 500 includes a body 510 that extends along a body axis B. The body 510 further includes a coupling member 512 that may be formed as a single unit with the body 510. The body 510 is further configured to movably couple to one or more securing members 520. As shown, the security apparatus 500 includes two (2) securing members 520 that are positioned at opposing ends of the body 510 and are configured to move relative to the body 510.

Figure 24:
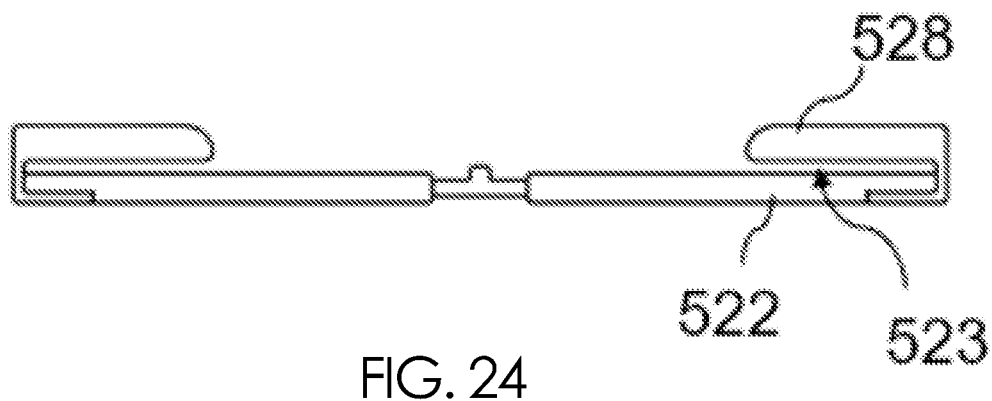
FIG. 24 illustrates a front view of the embodiment the security apparatus from FIG. 23.
Figure 25:
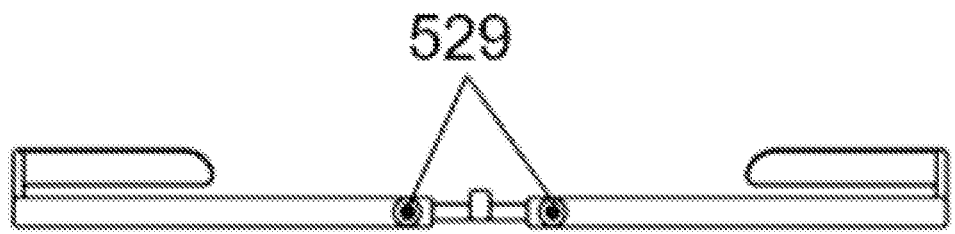
FIG. 25 illustrates a rear view of the embodiments of the security apparatus from FIGS. 23 and 24.

Each of the securing members 520 includes a body engagement portion 522 that is configured to engage with the body 510 and to aid or guide a sliding movement of the securing member 520 relative to the body 510. Each securing member 520 further includes a securing portion 524 which generally includes a support surface 525 that is structured to support the securing member 520, a stop surface 526, and a retainer member 528. The support surface 525 may further act to support the body 510 and hold the body 510 away from a display fixture 55. As shown in FIGS. 24 and 25, the retainer member 528 is configured such that a space 523 is defined between the retainer member 528 and a portion of the securing member 520, such as the body engagement portion 522. Referring specifically to FIG. 25, each securing member 520 further includes a lock member 529 that is configured to move between a locked state and an unlocked state. When in the locked state, the securing members 520 are inhibited from moving relative to the body 510, and when in the unlocked state the securing members 520 are enabled to move relative to the body 510 along the body axis B. In some embodiments, only one of the securing members 520 is able to move relative to the body 510 while the other securing member 520 is fixedly coupled to the body 510 or formed as a single unit with the body 510.

Figure 26:
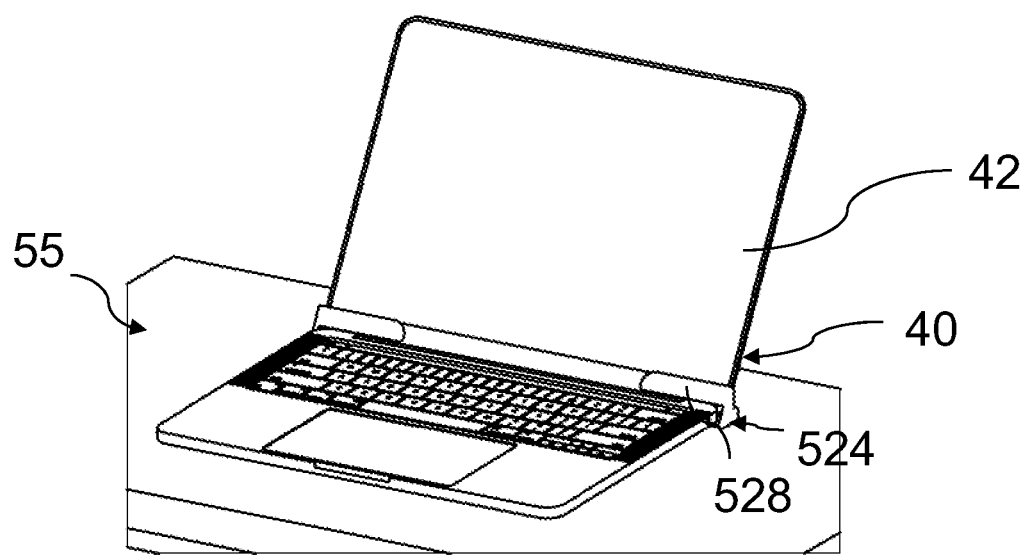
FIG. 26 illustrates a front perspective view of the embodiments of the security apparatus of FIGS. 23-25 securing a portable electronic device to a display fixture.
Figure 27:
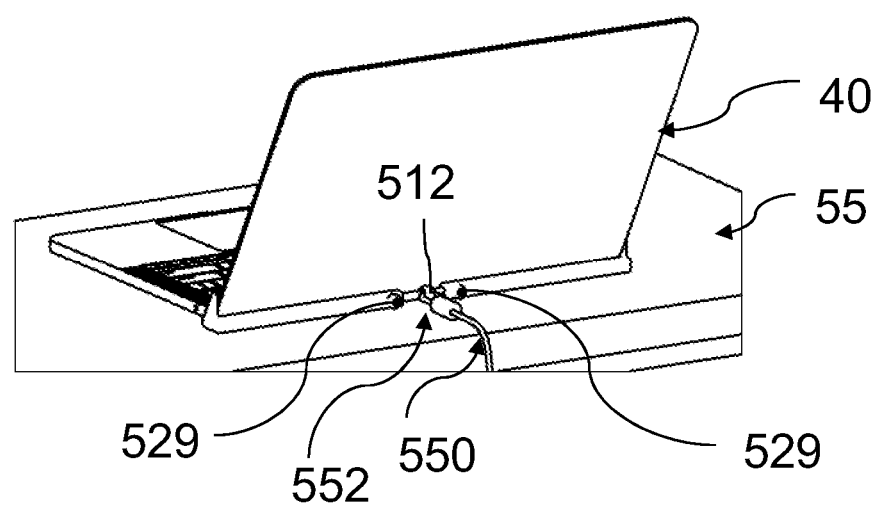
FIG. 27 illustrates a rear perspective view of the embodiment of the security apparatus of FIG. 26.

As shown in FIGS. 26 and 27, a laptop computer 40 may be secured by the security apparatus 500 as will now be explained. When the lock member(s) 529 are in the unlocked state, the securing members 520 may be slid towards each other to secure the laptop 40 such that a portion of the laptop computer 40 is positioned and secured within the space 523. Once the laptop computer 40 is secured, the locking member(s) 529 are moved to the locked state to inhibit movement of the securing members 520 relative to the body 510. As shown, a portion of the display end 42 of the laptop computer 40 is secured by the retainer member 528. In the secured position, the stop surface 526 limits the extent that the laptop computer 40 may be opened and the retainer member 528 together with the stop member 526 and the body 510 inhibit removal from the laptop computer 40 from the security apparatus 500. Once the portable electronic device, in this case the laptop computer 40 is secured by the security apparatus 500, an anchor member 550 is coupled to the coupling member 512 at one end 552 and fixedly secured to an anchor (not shown) at another end. In this manner, the portable electronic device, in this case the laptop computer 40, is secured within the security apparatus 500, but is able to be lifted away from the display fixture 55 or table top while also being inhibited from removal from the retail space due to the anchor member 550.

Referring to FIGS. 28-31, another embodiment of a security apparatus 600 is shown. Some aspects of this embodiment may be similar to other embodiments previously described and may not be described in great detail. The security apparatus 600 generally includes a body 610 and one or more securing members 620 movable coupled to the body 610. The body 610 extends along a body axis S and further includes a coupling member 612 that may be formed as a single unit with the body 610. The body 610 is further configured to movably couple to one or more securing members 620. As shown, the security apparatus 600 includes two (2) securing members 620 that are positioned at opposing ends of the body 610 and are movable relative to the body 610.

Figure 28:
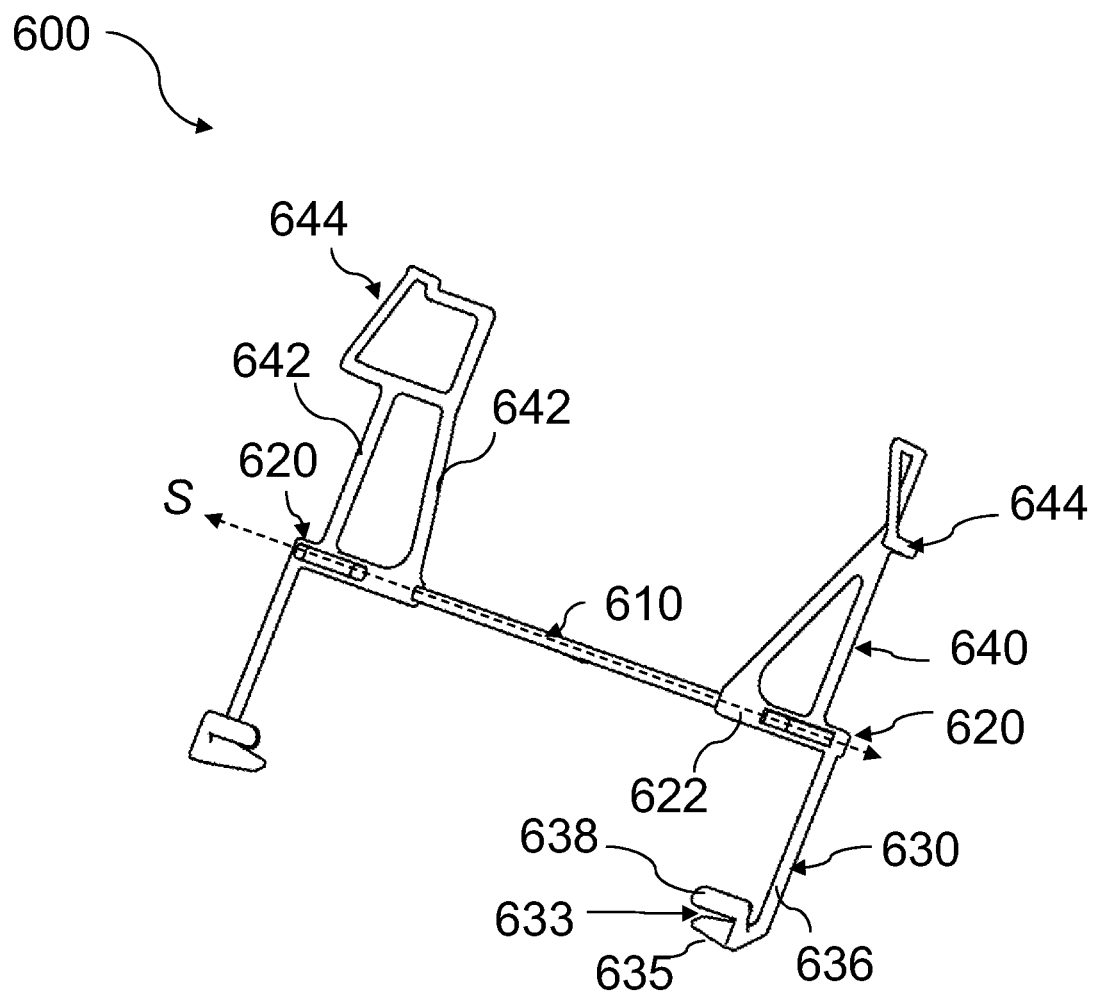
FIG. 28 illustrates a front perspective view of another embodiment of the security apparatus.

Each of the securing members 620 includes a body engagement portion 622 that is configured to engage with the body 610 and to aid or guide a sliding movement of the securing member 620 relative to the body 610. Each securing member 620 further includes a first securing portion 630 which generally includes a support surface 635 that is structured to contact the display fixture 55 support the securing member 620, one or more support members 636, and a retainer member 638. As shown in FIG. 28, the retainer member 638 is configured such that a space 633 is defined between the retainer member 638 and a portion of the securing member 620, such as the support surface 635. A second securing portion 640 is connected to the first securing portion 630 and generally includes one or more support members 642, a retainer member 644 and one or more support members 646.

Figure 29:
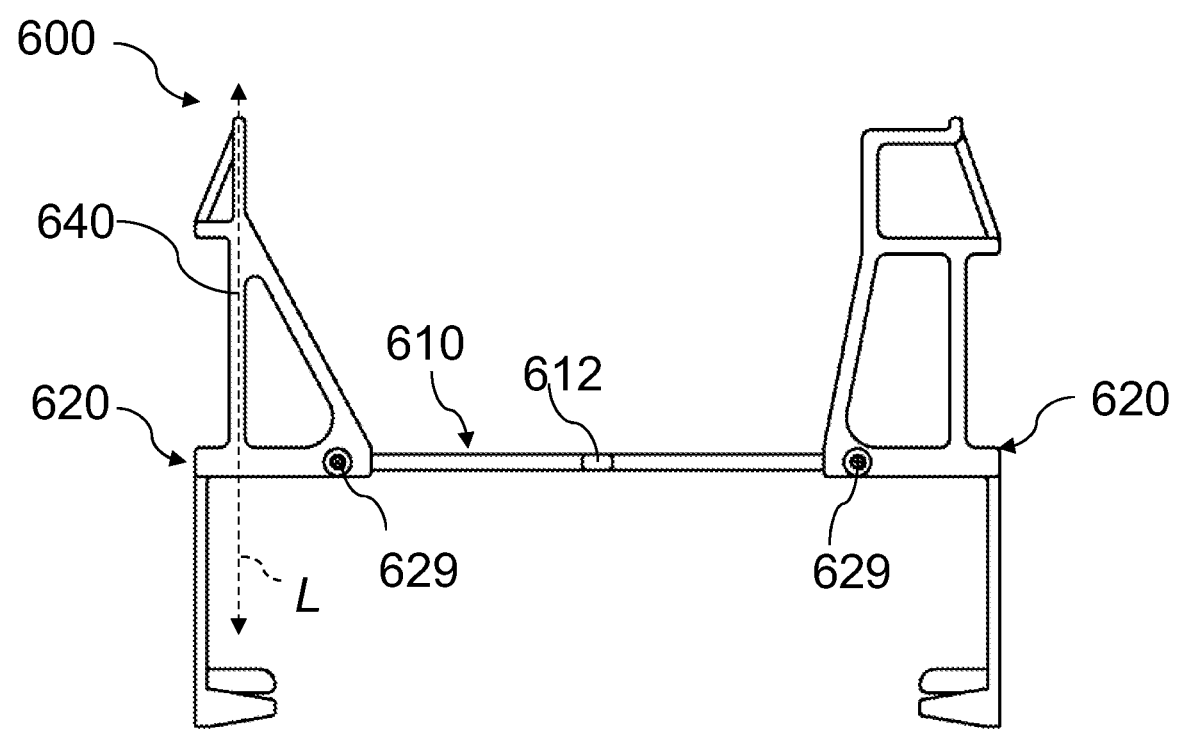
FIG. 29 illustrates a front view if the embodiment of FIG. 28.
Figure 30:
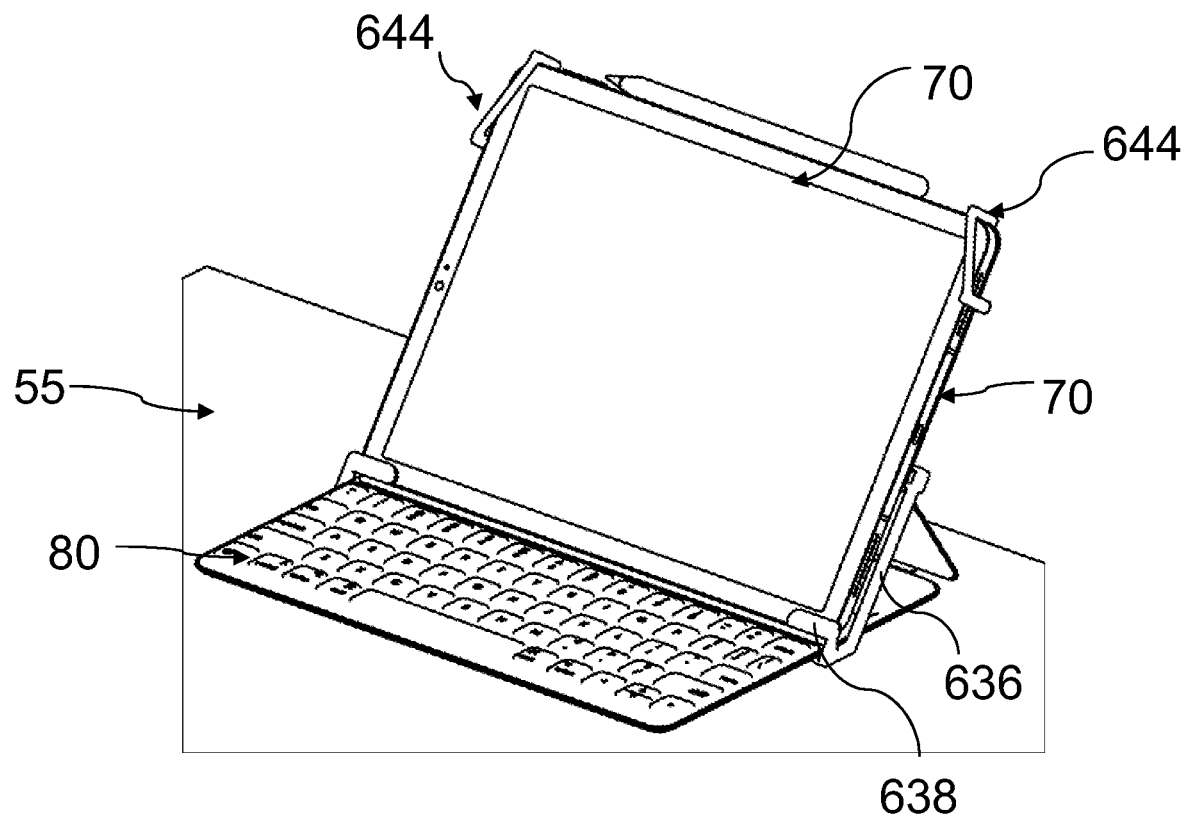
FIG. 30 illustrates a front perspective view of the security apparatus of FIGS. 28 and 29 securing a portable electronic device.
Figure 31:
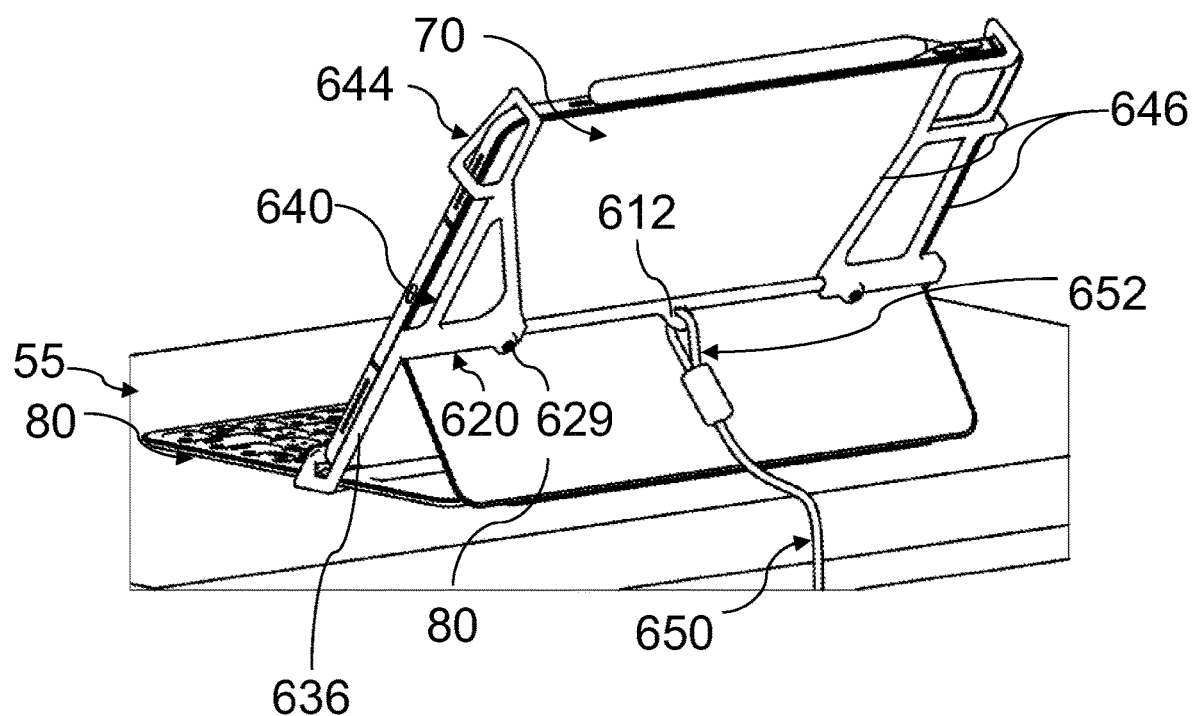
FIG. 31 illustrates a rear perspective view of the embodiment of FIG. 30.

Still referring to FIGS. 28 and 29, each securing member 620 further includes a lock member 629 that moves between a locked state and an unlocked state. In the locked state, the securing members 620 are inhibited from moving relative to the body 610. In the unlocked state, the securing members 620 are enabled to move relative to the body 610 along the body axis S. As shown in FIG. 29, the second securing portion 640 may be capable of adjusting along axis L to accommodate portable electronic devices of varying height. In said embodiment, an additional lock member 656 (FIG. 32) may be included to lock the second securing portion 640 to inhibit movement along the axis L.

As shown in FIGS. 28-32, a portable electronic device, such as a tablet 70 with a detachable keyboard 80, may be secured by the security apparatus 600 as will now be explained. When the lock member(s) 629 are in the unlocked state, the securing members 620 may be slid towards each other such that the first securing portions 630 retains and secures a portion of the tablet 70 within the space 633 via the retainer members 638. At the same time, the second securing portions 640 retain and secure another portion of the tablet 70 and a portion of the detachable keyboard 80 via the retainer members 644. Once the portable electronic device 40 is secured, the locking member(s) 629 are moved to the locked state to inhibit movement of the securing members 620 relative to the body 610. In the secured position, the tablet 70 and the detachable keyboard 80 are secured in the security apparatus 600 via the retainer members 638, 644 and the one or more support members 636, 646. Once the portable electronic device 40 is secured by the security apparatus 600, an anchor member 650 is coupled to the coupling member 612 at one end 652 and fixedly secured to an anchor (not shown) at another end. In this manner, the portable electronic device, in this case the tablet 70 and detachable keyboard 80, is secured within the security apparatus 600, but is able to be lifted away from the display fixture 55 or table top while also being inhibited from removal from the retail space due to the anchor member 650.

Figure 32:
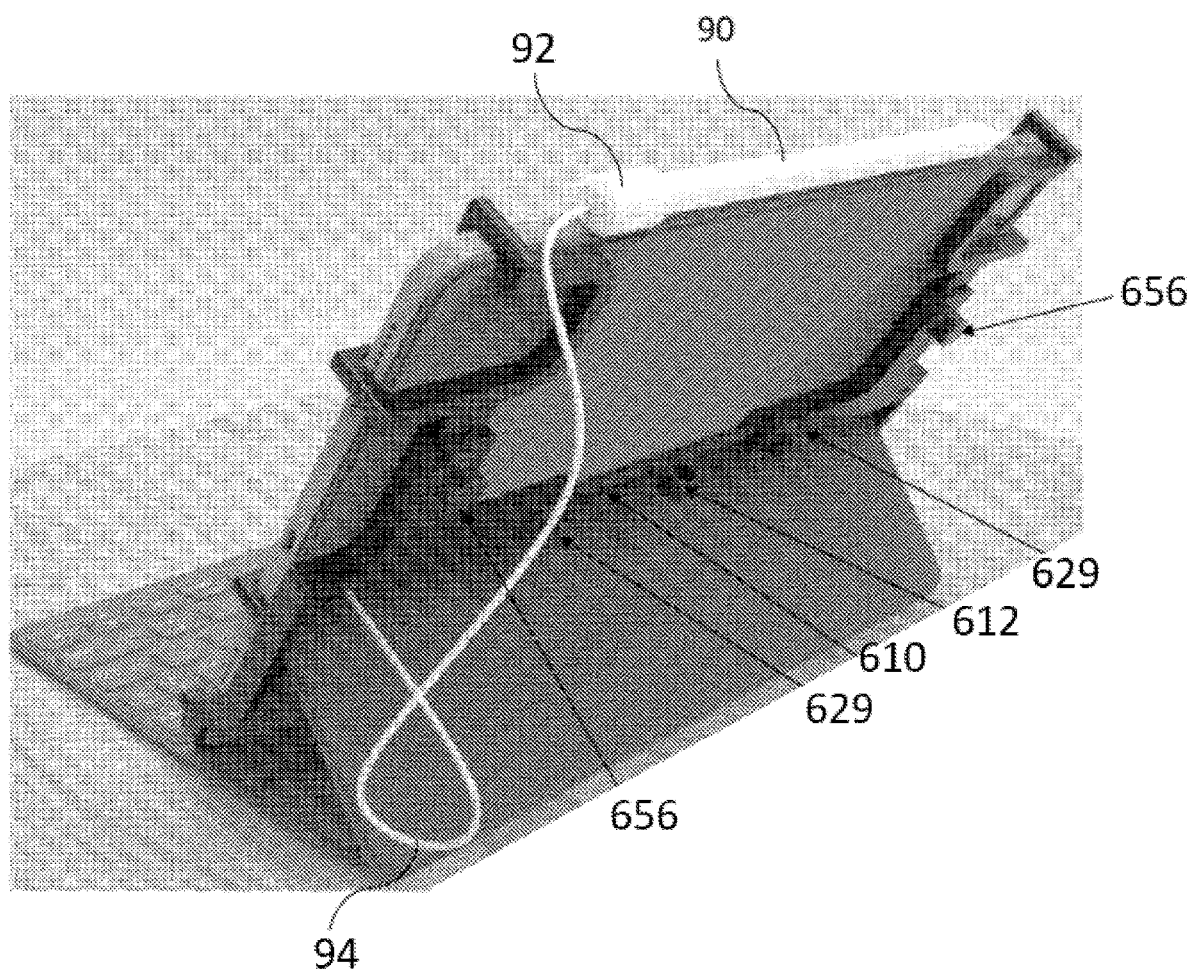
FIG. 32 illustrates another rear perspective view of the embodiment of FIG. 30.
Figure 33:
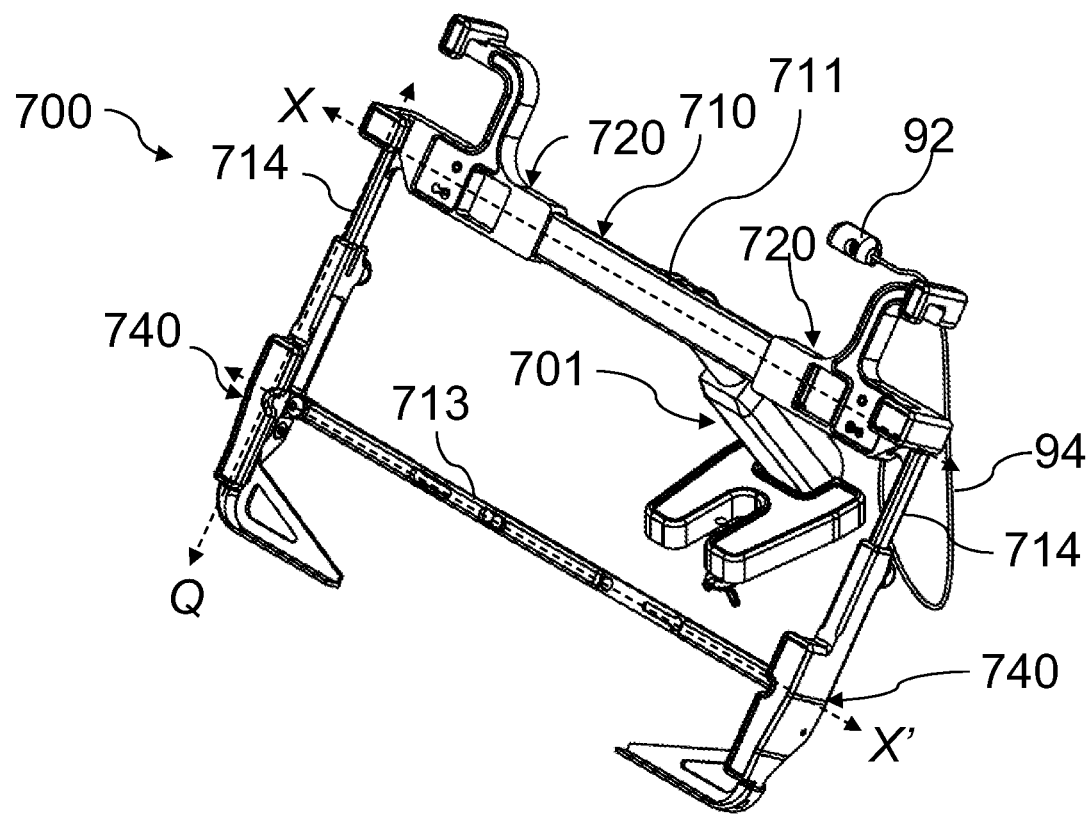
FIG. 33 illustrates a front perspective view of another embodiment of the security apparatus.
Figure 34:
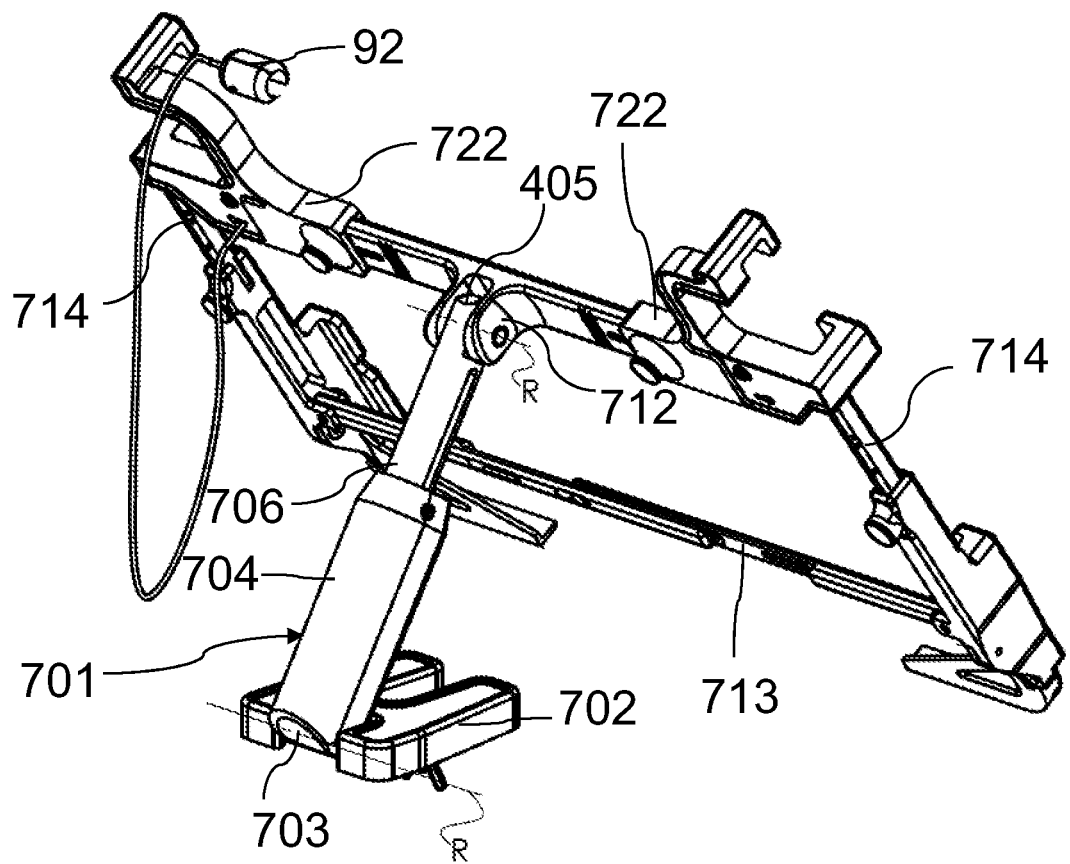
FIG. 34 illustrates a rear perspective view of the embodiment of FIG. 33.
Figure 35:
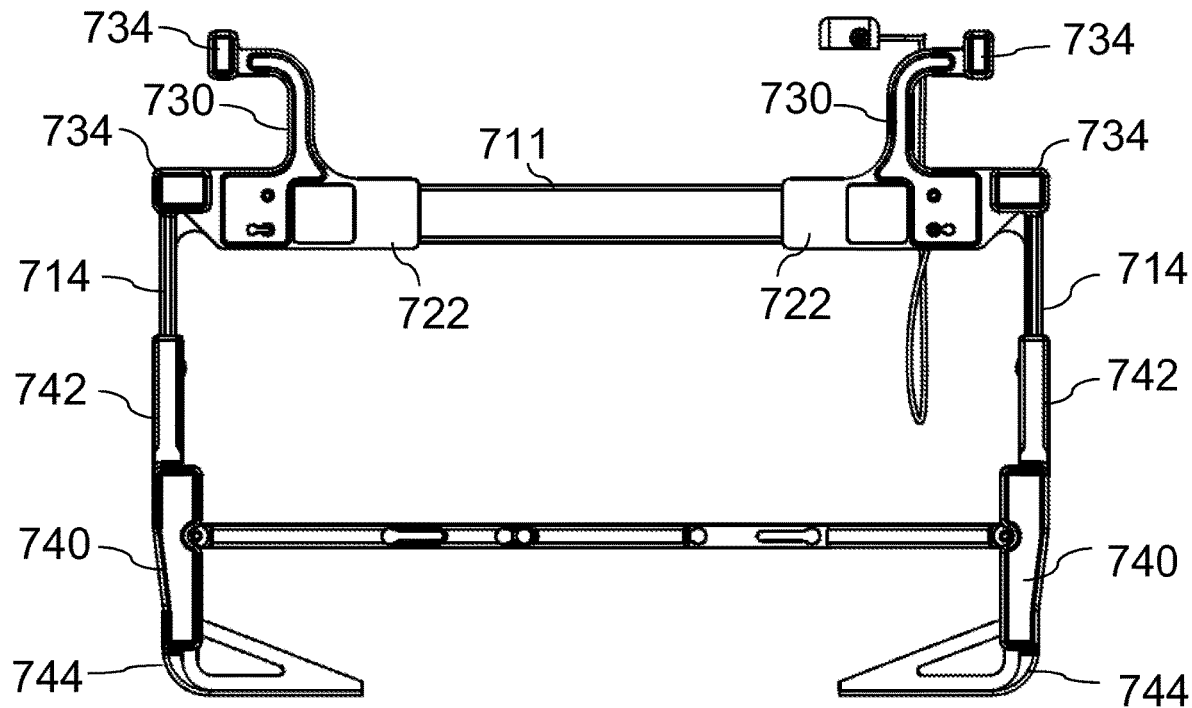
FIG. 35 illustrates a front view of an embodiment of a portion of the security apparatus of FIG. 33.
Figure 36:
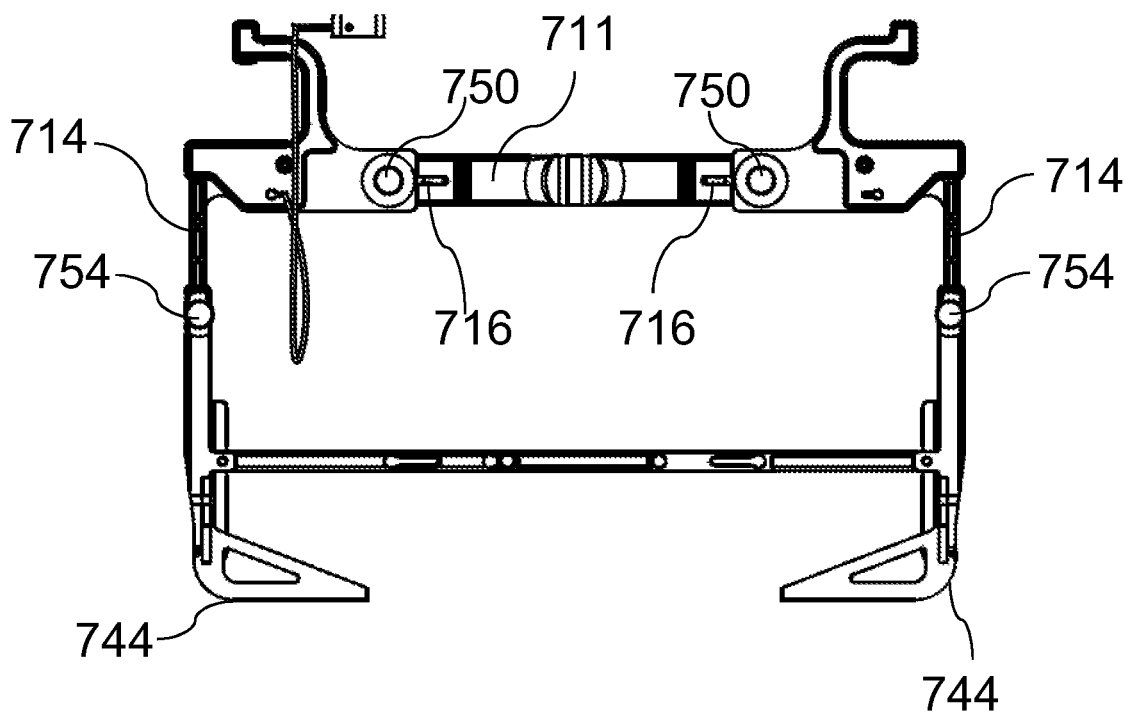
FIG. 36 illustrates a rear view of the embodiment of FIG. 35.
Figure 37:
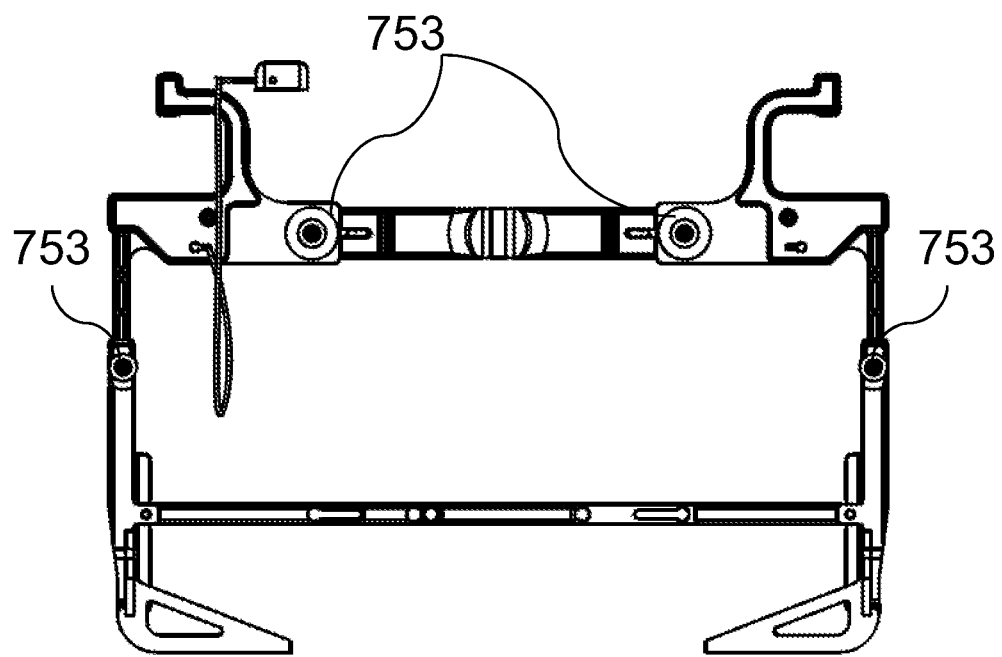
FIG. 37 illustrates another rear view of the embodiment of FIG. 35.

As shown in FIG. 32, the security apparatus 600 may be further structured to accommodate a stylus 90 or other accessory to be used with the portable electronic device 40 secured by the security apparatus 600. In an embodiment, the stylus 90 may be fitted with a coupling portion 92 and an anchor 94 that couples the coupling portion 92 to a portion of the security apparatus 600. In this manner, the accessory, in this case the stylus 90, may be used with the portable electronic device 40 secured in the security apparatus 600 while inhibiting theft of the accessory.

Another embodiment of the security apparatus 700 will be discussed with reference to FIGS. 33-44. This embodiment of the security apparatus 700 generally includes base assembly 701, a body 710 moveably coupled to the base assembly 701. A plurality of securing members 720, 740 are moveably coupled to the body 710. As show, the body 710 includes a plurality of body supports 711, 714. One or more lateral supports 713 or lateral guides may operatively couple the securing members 740 to each other. The one or more lateral supports 713 may extend along a support axis X'. In some embodiments, the support axis X' is parallel to the first body axis X.

Similar to other embodiments discussed, the body 710 further includes a coupling member 712 that may be formed as a single unit with the body 710. As shown, the security apparatus 700 includes two (2) upper securing members 720 that are positioned at opposing ends of the body support 711 and are configured to move relative to the body 710 along the first body axis X. Each of the upper securing members 720 includes a body engagement portion 722 that is structured to engage with the body 710 and to aid or guide a sliding movement of the upper securing member 720 relative to the body support 711. Each upper securing member 720 further includes one or more support members 330 that support, comprise or are connected to one or more retainer members 734 that are structured to retain a portion of a portable electronic device 40. As shown, the number of retainer members 734 is greater than illustrated in other embodiments, which provides an increased level of security. In an embodiment, the upper securing members 720 are adjustable relative to the body support 711 of the 710 to accommodate portable electronic devices of varying sizes. One or more lock members 750 may be provided that inhibit movement of the upper securing members 720 relative to the body support 711 of the body 710 and/or movement of the support members 730 relative to each other.

The security apparatus 700 further includes two (2) lower securing members 740 that are positioned along another body support 714 of the body 710 and are structured to move relative to the body support 714 along a second body axis Q that intersects the first body axis X. Each of the lower securing members 740 includes a body engagement portion 742 that is structured to engage with the body support 714 and to aid or guide a sliding movement of the lower securing members 740 relative to the body support 714. Each upper securing member 740 further includes one or more retainer members 744 that are structured to retain a portion of a portable electronic device 40. In an embodiment, the lower securing members 740 are adjustable relative to the body support 714 of the body 710 to accommodate portable electronic devices of varying sizes. One or more lock members 754 may be provided that inhibit movement of the lower securing members 740 relative to the body support 714 of the body 710 and/or movement of the retainer members 744 relative to each other.

The body 710 may further comprise one or more features 716, such as grooves or slots, that interact with a corresponding lock member 750, 754 to aid in securing the upper and lower securing members 720, 740 relative to the body 710. In an embodiment, the one or more lock members 750, 754 are structured to move between a locked state and an unlocked state. In the locked state, the upper and lower securing members 720, 740 are inhibited from moving relative to the body 710 and/or the support members/retainer members 730, 734, 744 from moving relative to each other. In the unlocked state, the upper and lower securing members 720 are enabled to move relative to the body 710 and/or the support members/retainer members 730, 734, 744 are enabled to move relative to each other. In some embodiments, the one or more lock members 750, 754 may be covered with a lock cap 753 for aesthetic or additional security purposes.

Figure 38:
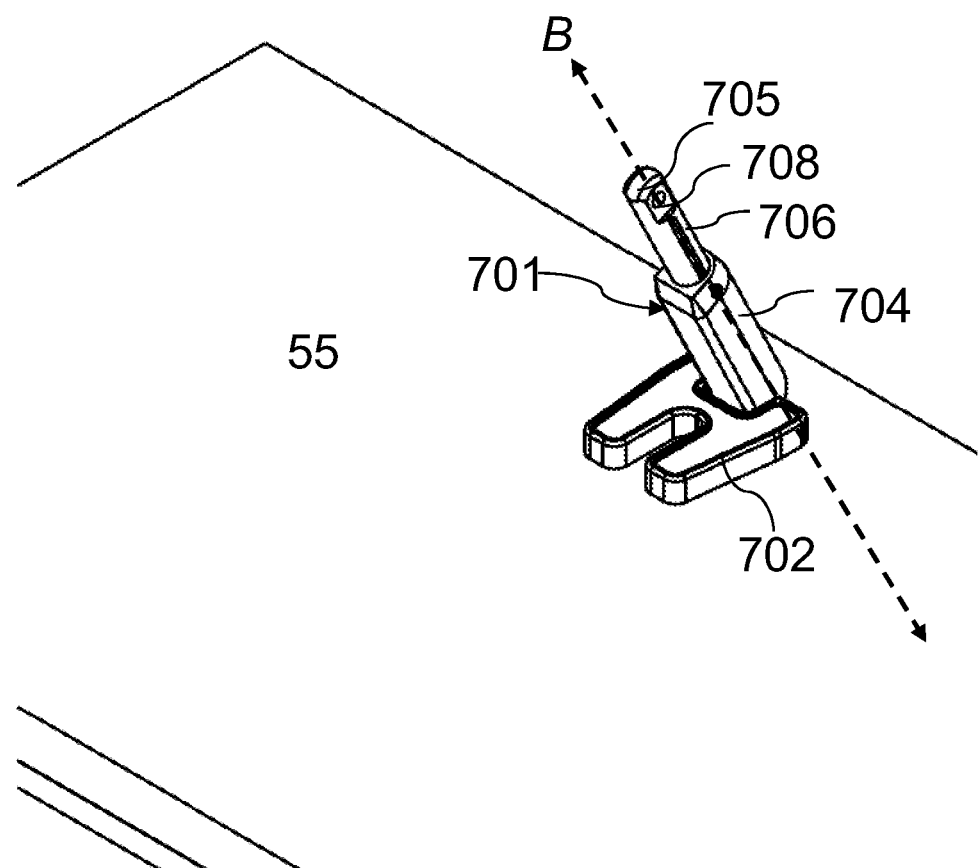
FIG. 38 illustrates a side perspective view of an embodiment of a base assembly of the security apparatus.
Figure 39:
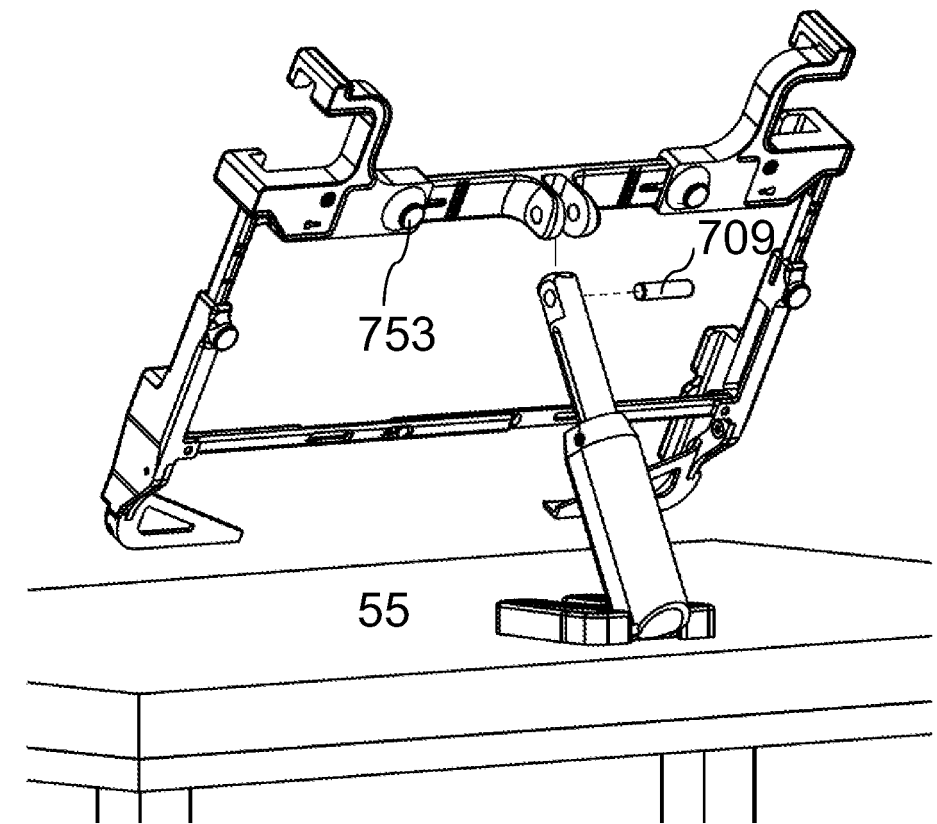
FIG. 39 illustrates a partial exploded view of the embodiment of the security apparatus of FIG. 33.

Referring to FIG. 38, the base 701 includes a base support 702, a first base portion 704 pivotally coupled to the base support 702 and a second base portion 706 moveably coupled to the first base support 704. The second base support 706 further includes a body coupler 705 that is structured to couple to the body 710 of the security apparatus 700. The base support 702 is structured to contact the display fixture 55 and be coupled to the display fixture 55. In an embodiment, the base support 702 is coupled to the display fixture 55 using one or more fasteners. The first base portion 704 is pivotally coupled to the base support 702 and is able to pivot about a pivot axis relative to the base support 702. The first base portion 704 and the second base portion 706 extend along a base assembly axis B. The second base portion 706 is structured to moveably couple to the first base portion 704 such that the second base portion 706 slides relative to the first base portion 704 along the base assembly axis B. When the body 710 is coupled to the base assembly 701, the body 710 is capable of pivoting relative to the body assembly 701 about a pivot axis 709, such as a fastener positioned extending through an opening 708. The body 710 is further structured to move along the base assembly axis B as the second base portion 706 moves relative to the first base portion 704.

Figure 40:
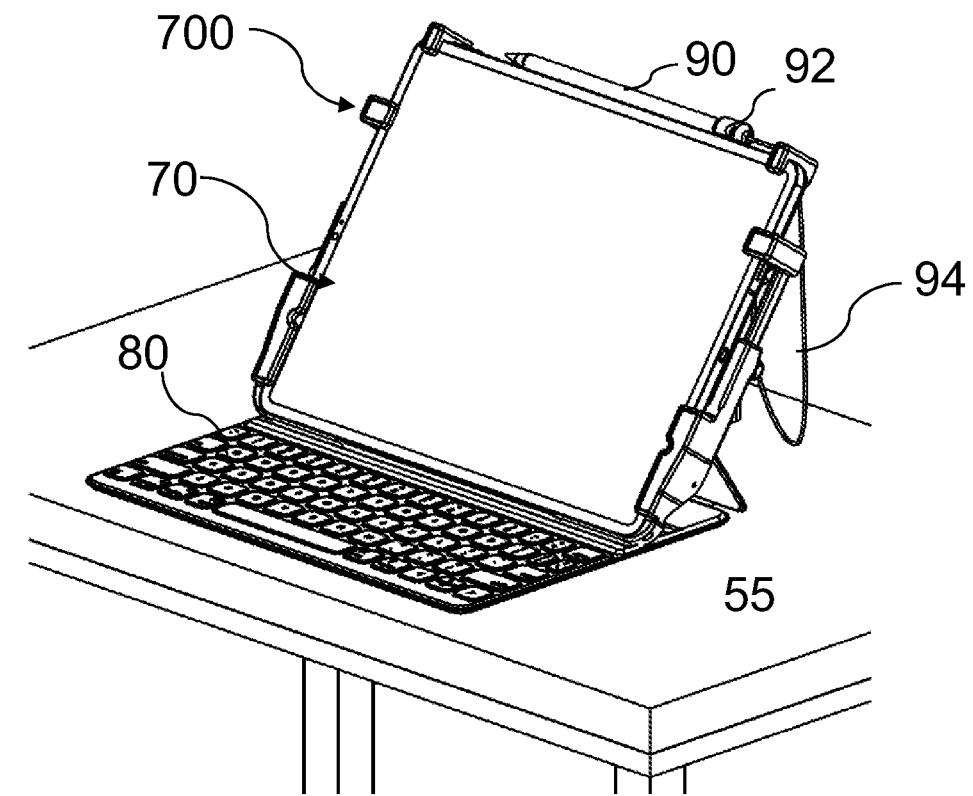
FIG. 40 illustrates a front perspective view of the embodiment of the security apparatus of FIG. 33 securing a portable electronic device.
Figure 41:
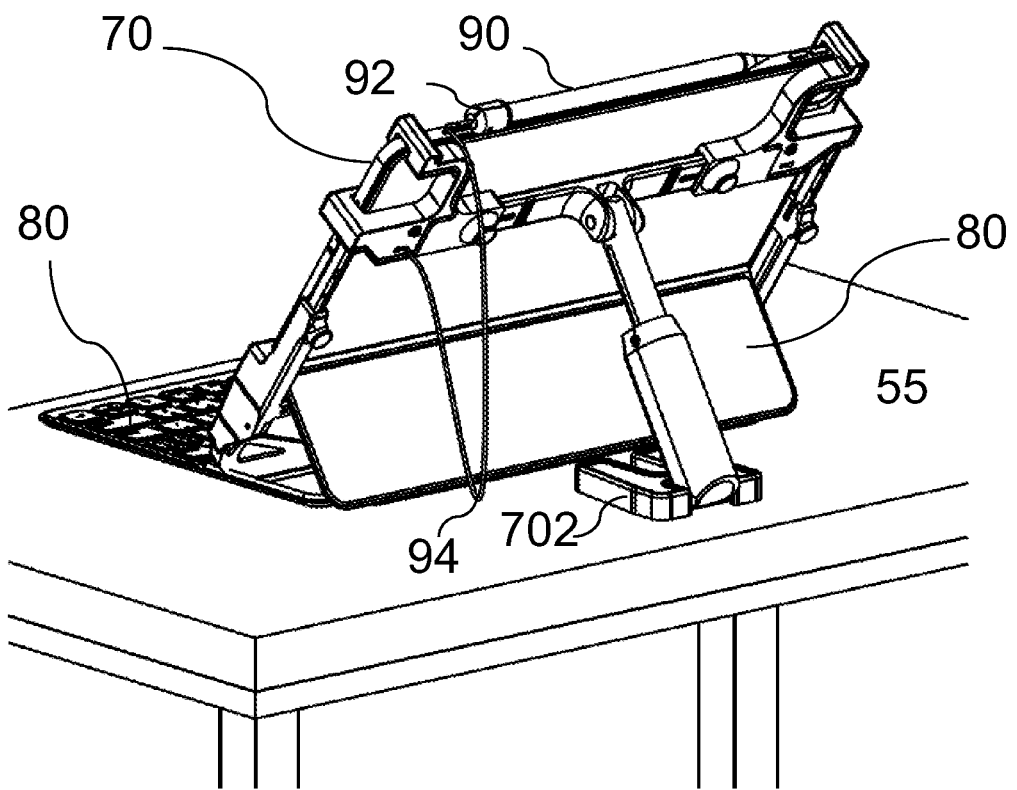
FIG. 41 illustrates a rear perspective view of the embodiment of FIG. 40.
Figure 42:
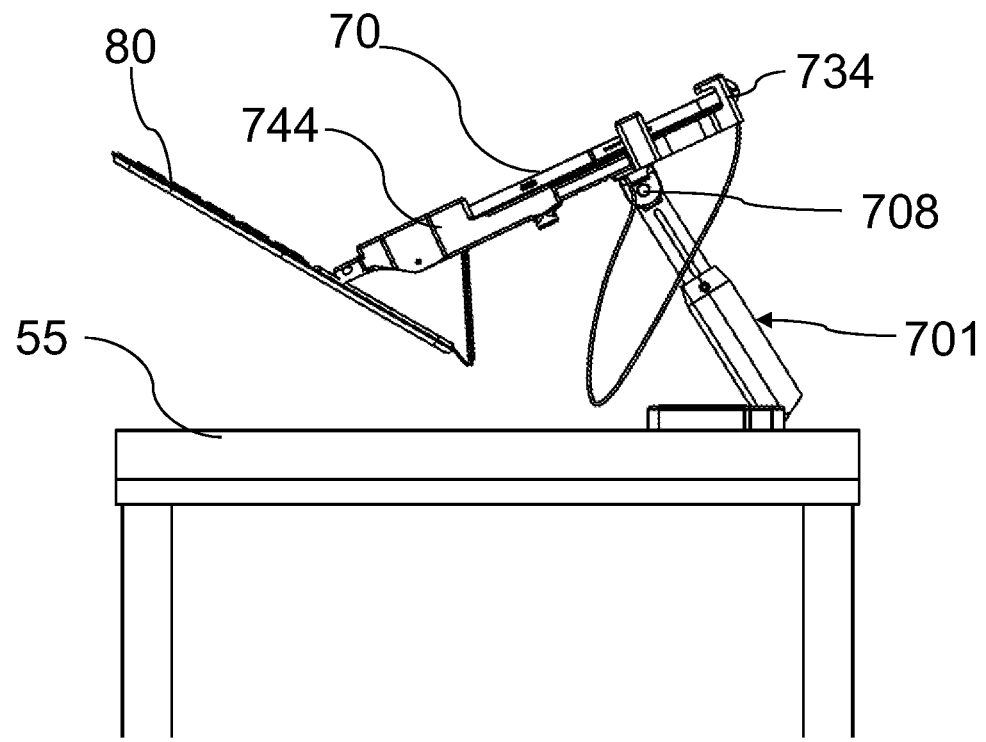
FIG. 42 illustrates a side elevational view of the embodiment of FIG. 40 showing the body of the security apparatus pivoted relative to the base assembly.

As shown in FIGS. 40-42, a portable electronic device, such as a tablet 70 with a detachable keyboard 80, may be secured by the security apparatus 700 as will now be explained. When the upper and lower securing members 720, 740 are in the unlocked state, they may be slid towards each other to clamp the tablet 70 and the detachable keyboard 80 within the security apparatus 700 and secure it to the display fixture 55. When the upper and lower securing members 720 are moved towards each other, they retain portions of the tablet 70 and the detachable keyboard 80 via the retaining members 734. Once secured, the upper securing members 720 may be moved to the locked state to inhibit movement of the upper securing members 720 relative to the body support 711 of the body 710. The lower securing members 740 may be moved along the second body axis Q towards or away from the upper securing members 720 to retain another portion of the tablet 70 via the retainer members 744. Once secured, the lower securing members 740 may be moved to the locked state such that they are inhibited from moving along the second body axis Q relative to the body support 714 of the body 710. The base support 702 is secured to a fixed structure such as a wall, floor or display fixture 55. In this manner, the portable electronic device, in this case the tablet 70 and the detachable keyboard 80, is inhibited from being stolen or removed from a display area since it is secured within the security apparatus 700 and the security apparatus 700 is secured to a fixed structure 55. In an embodiment, an accessory, such as a stylus 90, may be fitted with a coupling portion 92 and an anchor 94 that couples the coupling portion 92 to a portion of the security apparatus 700. In this manner, the accessory may be used with the portable electronic device 40 and secured by the security apparatus 600 to inhibit theft of the accessory.

One or more components of the embodiments of security apparatus 100, 500, 600, 700 and/or the mounting plate 200 described above may be comprised of one or more types of metal, such as steel, zinc, or aluminum, or one or more types of plastic, such as PA6 (Nylon 6), ABS (Acrylonitrile butadiene styrene), or POM (Polyoxymethylene). In an embodiment, one or more components of the security apparatus 100, 500, 600, 700 may be comprised of a combination of metallic and plastic components. One or more components of the embodiments of the security apparatus 100, 500, 600, 700 and the mounting plate 200 may be comprised of different sizes, thicknesses and shapes while still keeping with the spirit, function, and intent of each device.

In some embodiments, the security apparatus 100, 500, 600, 700 may further include a controller and a plurality of actuators that are operatively coupled to the securing portions. In these embodiments, the controller is programmed to receive instructions from an input interface or remote input device and control the plurality of actuators, an alarm and/or a controller status according to the received instructions. The controller may further be programmed to communicate to a remote input device and/or controllers of other security apparatuses using any known wireless communication protocol.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

The invention claimed is:

1. A security apparatus for securing a portable electronic device for retail display, comprising:
    a base assembly extending along a base assembly axis and configured to couple to a display fixture, the base assembly comprising,
        a first base assembly portion, and
        a second base assembly portion moveably coupled to the first base assembly portion and configured to move along the base assembly axis;
    a body extending along a body axis and configured to couple to one of the first and second base assembly portions;
    a first securing member coupled to the body;
    a second securing member coupled to the body, wherein at least one of the first and second securing members is configured to move along the body axis relative to the body,
    wherein the first and second securing members each comprise,
        a body engagement portion including a lock member, and
        a device engagement portion configured to at least partially surround a portion of the portable electronic device, and
    wherein the base assembly axis intersects the body axis, and
    wherein the second portion of the base assembly is configured to move along the base assembly axis to move the body along the base assembly axis.

2. The security apparatus of claim 1, wherein the body is moveably coupled to the base assembly and wherein the first and second securing members are configured to pivot about the body axis.

3. The security apparatus of claim 1, wherein the device engagement portion comprises two retainers configured to engage the portable electronic device.

4. The security apparatus of claim 3, wherein the two retainers are configured to move in a first direction towards each other and in a second direction away from each other.

5. The security apparatus of claim 1, wherein the device engagement portion further comprises at least one engagement portion lock configured to inhibit movement of the retainers relative to each other.

6. The security apparatus of claim 1, wherein the base assembly further comprises an anchor portion pivotally coupled to one of the first base assembly portion and the second base assembly portion and configured to contact the display fixture.

7. A security apparatus for securing a portable electronic device for retail display, comprising:
    a base assembly extending along a base assembly axis and configured to couple to a display fixture, the base assembly comprising a base portion configured to move along the base assembly axis;
    a body extending along a body axis and configured to couple to the base portion;
    a first securing member coupled to the body; and
    a second securing member coupled to the body, wherein at least one of the first and second securing members is configured to move along the body axis relative to the body,
    wherein the first and second securing members each comprise a device engagement portion configured to at least partially surround a portion of the portable electronic device, and
    wherein the base portion is configured to move along the base assembly axis to move the body along the base assembly axis.

8. The security assembly of claim 7, wherein the base assembly axis intersects the body axis.

9. The security apparatus of claim 7, wherein the body is moveably coupled to the base portion and wherein the first and second securing members are configured to pivot about the body axis.

10. The security apparatus of claim 7, wherein the device engagement portion comprises two retainers configured to engage the portable electronic device.

11. The security apparatus of claim 10, wherein the two retainers are configured to move in a first direction towards each other and in a second direction away from each other.

12. The security apparatus of claim 7, wherein the device engagement portion further comprises at least one engagement portion lock configured to inhibit movement of the retainers relative to each other.

13. The security apparatus of claim 7, wherein the base assembly further comprises an anchor portion pivotally coupled to the base portion and configured to contact the display fixture.

14. A method of manufacturing a security apparatus for securing a portable electronic device, comprising:
    structuring a base assembly to, extend along a base assembly axis,
couple to a display fixture,
comprise a base portion configured to move along the base assembly axis;

structuring a body to extend along a body axis and to couple to the base portion;

structuring a first securing member to couple to the body;

structuring a second securing member to couple to the body, wherein at least one of the first and second securing members is structured to move along the body axis relative to the body;

structuring the first and second securing members to each comprise a device engagement portion configured to at least partially surround a portion of the portable electronic device; and further structuring the base portion to move the body along the base assembly axis.

15. The method of claim 14, further comprising structuring the base assembly and the body so that the base assembly axis intersects the body axis.

16. The method of claim 14, further comprising structuring the body to be moveably coupled to the base portion such that the first and second securing members are configured to pivot about the body axis.

17. The method of claim 14, further comprising structuring the device engagement portion to comprise two retainers configured to engage the portable electronic device.

18. The method of claim 17, further comprising structuring the two retainers to move in a first direction towards each other and in a second direction away from each other.

19. The method of claim 18, further comprising structuring the device engagement portion to comprise at least one engagement portion lock configured to inhibit movement of the two retainers relative to each other.

20. The method of claim 14, further comprising structuring the base assembly to comprise an anchor portion pivotally coupled to the base portion and configured to contact the display fixture.

* * * * *